(12) United States Patent
de Lima Ottoni et al.

(10) Patent No.: US 9,152,400 B2
(45) Date of Patent: Oct. 6, 2015

(54) ELIMINATING REDUNDANT REFERENCE COUNT OPERATIONS IN INTERMEDIATE REPRESENTATION OF SCRIPT CODE

(71) Applicant: Facebook, Inc., Menlo Park, CA (US)

(72) Inventors: Guilherme de Lima Ottoni, Campbell, CA (US); Brett Hain Simmers, Mountain View, CA (US); Bertrand Allen Maher, Newark, CA (US); Edwin Thur Gideon Smith, Newton, MA (US)

(73) Assignee: Facebook, Inc., Mento Park, CA (US)

( * ) Notice: Subject to any disclaimer, the term of this patent is extended or adjusted under 35 U.S.C. 154(b) by 0 days.

(21) Appl. No.: 14/543,615

(22) Filed: Nov. 17, 2014

(65) Prior Publication Data

US 2015/0074655 A1    Mar. 12, 2015

Related U.S. Application Data

(63) Continuation-in-part of application No. 13/865,932, filed on Apr. 18, 2013, now Pat. No. 8,990,789.

(51) Int. Cl.
| | | |
|---|---|---|
| *G06F 9/45* | (2006.01) | |
| *G06F 9/455* | (2006.01) | |
| *G06F 9/32* | (2006.01) | |
| *G06F 12/02* | (2006.01) | |

(52) U.S. Cl.
CPC *G06F 8/443* (2013.01); *G06F 8/52* (2013.01); *G06F 9/321* (2013.01); *G06F 9/45525* (2013.01); *G06F 12/0261* (2013.01)

(58) Field of Classification Search
CPC .................................................. G06F 9/321
USPC ........................................... 717/146; 711/219
See application file for complete search history.

(56) References Cited

U.S. PATENT DOCUMENTS

| | | | | |
|---|---|---|---|---|
| 4,716,524 | A * | 12/1987 | Oxley et al. ................... | 711/219 |
| 4,996,663 | A * | 2/1991 | Nemes ................................. | 1/1 |
| 5,121,495 | A * | 6/1992 | Nemes ................................. | 1/1 |
| 6,230,312 | B1 | 5/2001 | Hunt | |
| 6,473,773 | B1 | 10/2002 | Cheng et al. | |

(Continued)

OTHER PUBLICATIONS

Tzi-cker Chiueh, "An Architectural Technique for Cache-level Garbage Collection", 1991.*
Notice of Allowance Mailed Dec. 22, 2014, in Co-Pending U.S. Appl. No. 13/865,932 of Adl-Tabatabai, A.-R., et al., filed Apr. 18, 2013.

(Continued)

*Primary Examiner* — Phillip H Nguyen
(74) *Attorney, Agent, or Firm* — Perkins Coie LLP

(57) ABSTRACT

The disclosure is related to optimizing generation of intermediate representation (IR) for a script code by eliminating redundant reference count code from the IR. The reference count code includes code that manages a reference count of an object, e.g., code that increments a reference count of the object ("incref code") and an observer code which consumes or the execution of which depends on the reference count of the object. The IR is analyzed to identify redundant reference count code. Counters associated with the object are evaluated and upon satisfying the optimization criterion, the incref code is moved closer to the observer code. The incref code and the observer code that are adjacent to each other are identified as redundant code pair and the code pair is eliminated from the IR to generate an optimized IR. The optimized IR is further converted to an executable code.

20 Claims, 19 Drawing Sheets

(56) References Cited

U.S. PATENT DOCUMENTS

| | | |
|---|---|---|
| 6,499,137 B1 | 12/2002 | Hunt |
| 7,203,933 B2 | 4/2007 | Souloglou et al. |
| 7,203,934 B2 | 4/2007 | Souloglou et al. |
| 7,565,386 B2 | 7/2009 | Joisha |
| 7,580,997 B2 * | 8/2009 | Sterling et al. ............... 709/224 |
| 7,693,919 B2 | 4/2010 | Joisha |
| 2004/0128660 A1 | 7/2004 | Nair et al. |
| 2005/0273772 A1 | 12/2005 | Matsakis et al. |
| 2007/0226281 A1 | 9/2007 | Joisha |

OTHER PUBLICATIONS

Non-Final Office Action Mailed Sep. 17, 2014 in Co-Pending U.S. Appl. No. 13/865,932 of Adl-Tabatabai, A.-R., et al., filed Apr. 18, 2013.

Armstrong, Timothy G. et al., "Compiler Optimization for Distributed Dynamic Data Flow Programs", 2013.

Joisha, Pramod G., "Compiler Optimizations for Nondeferred Reference-Counting Garbage Collection,"—ISMM'06 , Ottawa, Ontario, Canada, Jun. 10-11, 2006, pp. 150-161.

* cited by examiner

ELIMINATING REDUNDANT REFERENCE COUNT OPERATIONS IN INTERMEDIATE REPRESENTATION OF SCRIPT CODE

CROSS-REFERENCE TO RELATED APPLICATION(S)

This application is a continuation-in-part of U.S. application Ser. No. 13/865,932 titled "OPTIMIZING INTERMEDIATE REPRESENTATION OF SCRIPT CODE BY ELIMINATING REDUNDANT REFERENCE COUNT OPERATIONS," filed Apr. 18, 2013, which is incorporated herein by reference in its entirety.

BACKGROUND

Scripting languages offer simplicity and ease of development to software developers. Script code can be easy to write because scripting languages are often based on a small set of expressions and statements that are simple to learn. Software developers often use scripting languages for rapid development of applications, for example, web applications. Scripting languages may be used for server side programs or for client side programs. Examples of server side scripting languages include PHP (Personal Home Page) and examples of client side scripting languages include JAVASCRIPT.

Server side script code can be used for executing a user request received at a web server by dynamically generating web pages. Server side scripting is often used for implementing of interactive websites that interface with data stores for retrieving and storing information. The PHP scripting language enables embedding of script code with hypertext markup language (HTML). Client side script code is often used for performing simple computations on the client side rather than sending a request to the server for simple computations.

Conventional approaches to execute script code include executing the script code using an interpreter. However, an interpreter may not be able to perform several optimizations that a compiler that generates executable code can perform. Therefore, interpreting script code can be inefficient compared to running executable code obtained by compiling the script code. Most compilers translate the source program first to some form of intermediate representation (IR) and convert from there into machine code. The IR is independent of the machine for which the IR is generated, and independent of the source code language it is generated from.

There are many IRs in use but these various representations do not provide efficient means for tracking references an object allocated in the memory. When an object is created and allocated space in the memory, many variables can refer to the same object, that is, the object may have various pointers pointing to the object. The current IRs do not provide an efficient way to track the number of references to the object. The operations for tracking the references, such as incrementing a count when a new pointer is pointing to the object and decrementing a count when the pointer is removed, are built into or inherent to the operations that create, delete, assign objects. The current IRs typically do not provide an opportunity to optimize the reference count operations.

Some optimization techniques that optimize the reference count operations in the IRs are not effective and/or efficient. For example, the optimization techniques fail to identify the redundant reference count operations in some scenarios. In another example, the optimizer produces "buggy" code or invalid code in the IRs. Accordingly, an executable code generated from the IR includes a significant amount of code for tracking the references, which consumes significant computing resources and/or includes "buggy" code that can deter the execution of the program.

DETAILED DESCRIPTION

Figure 1:
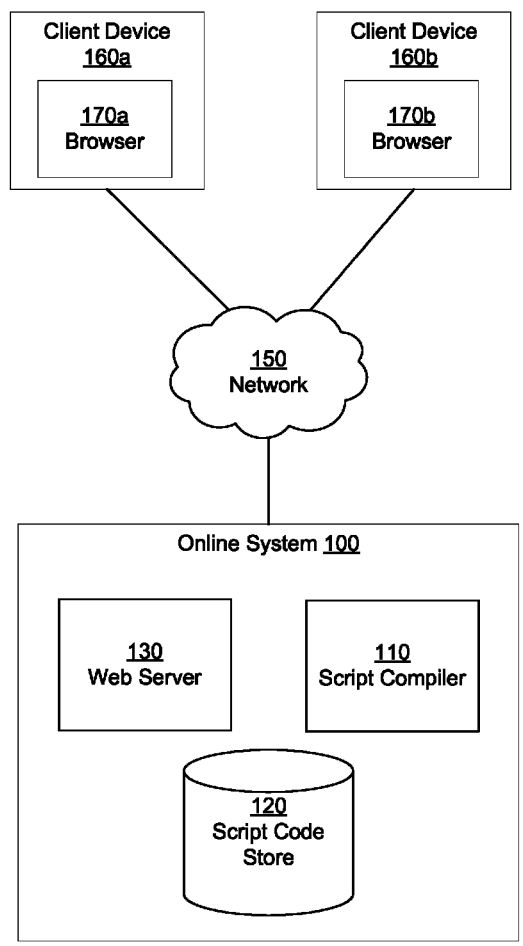
FIG. 1 is a block diagram of an environment in which optimization of an intermediate representation (IR) of a script code can be implemented.

Disclosed are embodiments for optimizing an intermediate representation (IR) of a script code by eliminating redundant reference count operations from the IR. In some embodiments, the IR is a machine-and-language independent version of a source code of a program, e.g., script code. A compiler can translate the source code to some form of IR and then convert the IR into machine code/executable code. The IR generated for the script code includes operations for tracking a reference count of an object, that is, number of references to an object. The generated IR includes (a) code that increments a reference count of an object (referred to as "incref" code) when a programming construct, e.g., a variable, refers to the object, and (b) an observer code whose execution depends on the value of the reference count. In some embodiments, the observer code can include code which decrements the reference count of the object (referred to as "decref" code) when a reference to the object is removed. Other examples of observer code include code for managing arrays.

Although the embodiments for optimizing the IR are described using decref code as an example, it should be noted that the embodiments are not restricted to decref code. The embodiments are application to any type of observer code that consumes and/or whose execution depends on a value of the reference count of an object.

The IR is analyzed to identify decref code which, upon execution, does not decrement the reference count of the object to a zero value. The decref code and the corresponding incref code pair is marked as redundant code, and is removed from the IR to generate an optimized IR. The analysis can include identifying the occurrences of incref code and decref code of the object and whenever optimization is possible (e.g., decref code does not yield zero value reference count) the incref code is moved to closer the decref code. Next, the incref code and the decref code that are adjacent to each other (referred to as "incref-decref pair") are identified, and the IR is optimized by removing the incref-decref pair. The optimized IR is further converted to an executable code for execution of the script code.

In some embodiments, various counters, e.g., an optimized counter and a real counter, are used to identify the decref code that, upon execution, does not decrement the reference count of the object to a zero value. The optimized counter can maintain an optimized reference count of the object and the real counter can maintain an actual reference count of the object. During the analysis, the counters are initialized to a specified value, e.g., "1," when an object is referred to for the first time (e.g., when a local variable refers to an object for the first time in a method of the script code), and the real counter is incremented by a specified value, e.g., "1," at every occurrence of the incref code for the object. Then, at a first occurrence of the decref code, both the optimized counter and the real counter can be evaluated to determine if they satisfy an optimization criterion specified by the decref code, e.g., whether at least one of the counters is not equal to "1."

If the counters satisfy the optimization criterion, the incref code occurring prior to the first occurrence of the decref code can be moved adjacent to the decref code. For example, the first occurrence of the incref code is moved to immediately before the decref code, e.g., the IR does not have any other code between the first occurrence of the incref code and the decref code, and the remaining occurrences of the incref code can be moved to after the decref code. The remaining occurrences of the incref code can be moved to immediately after the decref code or after other lines of code after the decref code. After the incref code is moved, both the optimization counter and the real counter can be incremented by a unit. The analysis then identifies the adjacent pairs of the incref and decref code, e.g., incref-decref pair and removes the incref-decref pair from the IR.

The IR for the script code could be in various formats that are in between the original source code and an executable code generated for a particular machine. The various formats can include a byte code, a low level language code, or any other human understandable format. An IR generation module generates the IR of the script code. The IR includes code for tracking references to an object. In some programming languages, a user-defined code, such as a destructor, is executed to perform certain other operations when the object is not being referred to anymore and the memory allocated to the object is reclaimed. In some embodiments, the decref code can trigger the execution of the destructor when the reference count of the object goes down to zero. The IR can be analyzed to find decref code that does not decrement the reference count to zero and eliminate the identified incref-decref code pair from the IR. The resulting IR will have fewer instructions to execute, and the generated executable code therefore, consumes lesser computing resources to execute, thereby enhancing the execution performance of the script code.

The script code can be written in various programming languages, including PHP (Personal Home Page), and can be executed in either a single-threaded environment or multi-threaded environment. The embodiments of the disclosed technique for optimizing the IR are described at least with reference to FIGS. 6-12. Further, the above described embodiments may be performed in various environments, including the environment described in association with FIGS. 1-5.

Turning now to the figures, FIG. 1 is a block diagram of an environment in which optimization of an intermediate representation (IR) of a script code can be implemented. The environment includes a client device that interacts with an online system that generates dynamic web pages by compiling script code. The process of compiling the script code can include generating an IR from the script code, optimizing the IR, generating executable code for the optimized IR, and executing the executable code to generate the dynamic web pages. The client devices 160 send requests, e.g., web page requests, to the online system 100 via the network 150. The online system 100 may dynamically generate web pages in response to the request and send the generated web pages to the client device 160 in response to the request.

FIG. 1 and the other figures use like reference numerals to identify like elements. A letter after a reference numeral, such as "160*a*," indicates that the text refers specifically to the element having that particular reference numeral. A reference numeral in the text without a following letter, such as "160," refers to any or all of the elements in the figures bearing that reference numeral (e.g., "160" in the text refers to reference numerals "160*a*" and/or "160*b*" in the figures).

Embodiments of the computing environment can have multiple client devices 160 and multiple online systems 100 connected to the network 150. Certain functionality described in one embodiment as being performed on the server side can also be performed on the client side in other embodiments if appropriate. For example, although FIG. 1 shows the script compiler 110 executing at the online system 100 for compiling server side script code, in other embodiments, the script compiler 110 may execute at the client device 160 for compiling client side script code. In addition, the functionality attributed to a particular component can be performed by different or multiple components operating together.

The client devices 160 include one or more computing devices that can receive user input and can transmit and receive data via the network 150. The client device 160 can execute an application, for example, a browser application 170 that allows a user of the client device 160 to interact with the online system 100. A user may provide input using a user interface presented to the user via the browser application 170. The interactions of the user via the browser application 170 may cause the browser application 170 to send a request for information that identifies a markup language document including server side scripting code. The markup language document is processed to obtain a transformed markup language document that is returned in response to the request.

The network 150 uses standard communications technologies and/or protocols. Thus, the network 150 can include links using technologies such as Ethernet, 802.11, worldwide interoperability for microwave access (WiMAX), 3G, digital subscriber line (DSL), etc. Similarly, the networking protocols used on the network 150 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 150 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), Internet Protocol security (IPsec), etc.

The online system 100 comprises a web server 130, a script compiler 110 and a script code store 120. The web server 130 is a module processing requests received by the online system 100 from client devices 160 or other external systems that interact with the online system 100. The web server 130 can be implemented by conventional web server software, such as APACHE or INTERNET INFORMATION SERVICES. In response to a request from a client device 160, the web server 130 may invoke other modules of the online system 100 to process the request. For example, the web server 130 may invoke modules of the online system 100 to obtain a web page in response to the request from the client device 160. The web server 130 sends the web page to the client device 160 for presentation on the browser 170.

The script code store 120 stores script code that implements portions of functionality provided by the online system 100 to client devices 160. A script code may include a function, procedure, method, or a block of code that may be embedded within an HTML document. The script code implements functionality, for example, retrieving information stored in various databases of the online system 100, performing computations, or interacting with other systems.

The script compiler 110 takes script code in source code form and generates equivalent executable code for execution by a processor of the online system 100 (in this disclosure, the term "script code" is also referred to as "script".) In an embodiment, the script compiler 110 performs incremental compilation of the script code in a lazy fashion. For example, a portion of script code is compiled if a request causes this portion of script code to execute. Once a portion of the script code is compiled, the generated executable code is available for future requests. However, if no request received by the online system 100 needs to execute a particular portion of the script code, that particular portion may not be compiled. Therefore, no executable code corresponding to a particular portion of script may exist in the online system 100 if no request from a client device needs to execute that portion of script. For example, a script may include an "if-then-else" statement that executes an "if" portion of script if a condition evaluates to true and an "else" portion of script if the condition evaluates to false. If all incoming requests evaluate the condition to a true value, these request only execute the "if" part of the script. Accordingly, executable code corresponding to the "else" part of the "if-then else" statement may never be generated, unless an incoming request results in the condition being evaluated to a false value.

Figure 2:
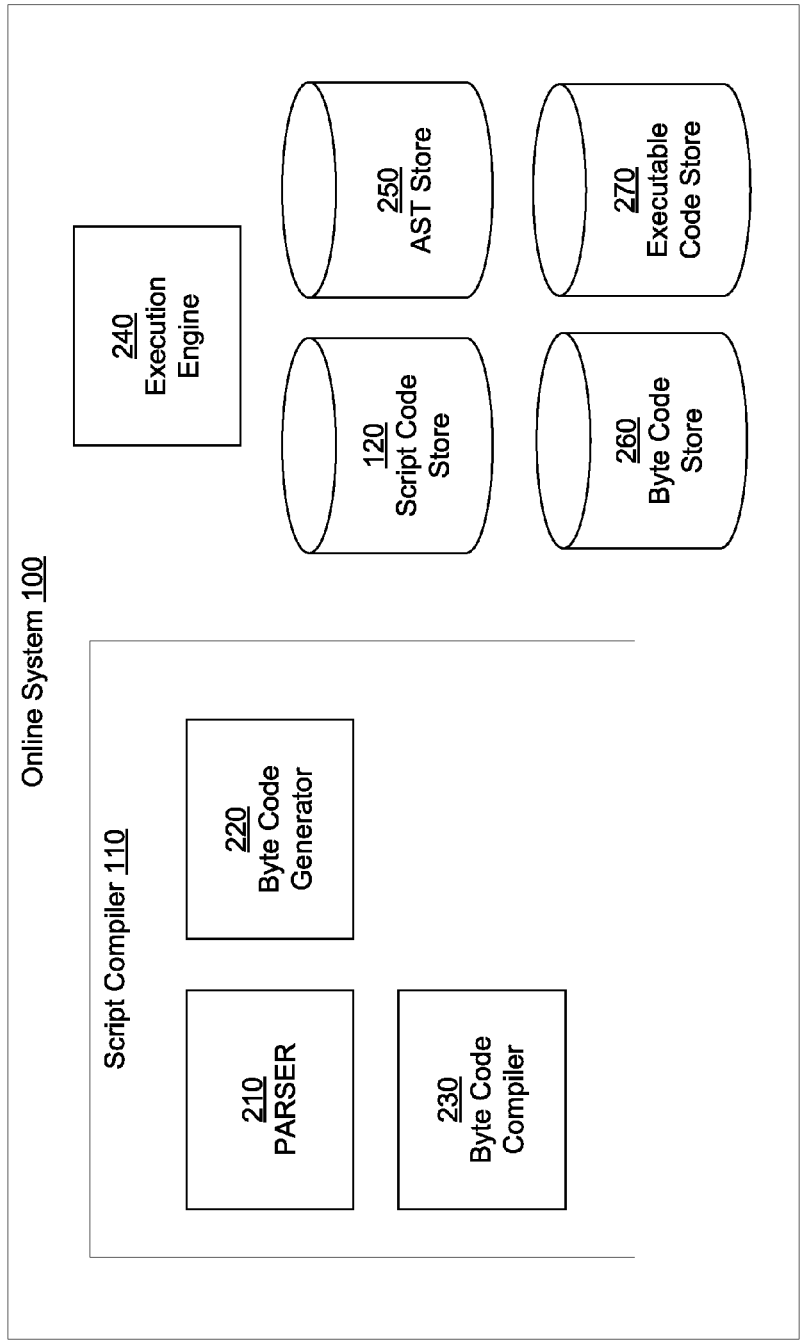
FIG. 2 is a block diagram illustrating an architecture of an online system that generates dynamic web pages by incrementally compiling script code at runtime.

FIG. 2 is a block diagram illustrating an architecture of an online system that generates dynamic web pages by incrementally compiling script code at runtime, consistent with various embodiments. The online system includes the script code store 120, an abstract syntax tree (AST) store 250, a byte code store 260, an executable code store 270, an execution engine 240, and the script compiler 110. The script compiler 110 further includes a parser 210, a byte code generator 220, and a byte code compiler 230. Some embodiments of the online system 100 have different and/or other modules than the ones described herein, and the functions can be distributed among the modules in a different manner than is described here. For example, several modules shown in the online system 100 may be present in a client device 160 if the script code being processed is client side script code.

The script code store 120 stores script code, for example, script code specified as PHP, server side JAVASCRIPT, or another syntax. The script code may be input by a software developer using an editor or copied from another computer. In an embodiment, the script code is specified in a human readable text form. The parser 210 reads the script code from one or more files in the script code store 120 and builds a data structure called an AST that is stored in the AST store 250. The AST is a hierarchical tree representation of script code. The parser 125 checks the script code for syntax errors and reports the errors to allow a user to correct the errors.

The byte code generator 220 traverses the AST representation of the script code and generates byte code corresponding to the script code. The byte code is stored in the byte code store 260. The byte code includes code represented using an instruction set that is designed for efficient execution by an interpreter or for efficient compilation into executable code, for example, machine code. The byte code instructions may correspond to a virtual stack machine or a virtual register machine. The byte code compiler 230 converts byte code into executable code and stores the generated executable code in the executable code store 270.

The execution engine 240 executes the instructions available in the executable store 270. For example, the execution engine 240 may be invoked in response to a request received from a client device 160. The execution engine 240 identifies executable code corresponding to the request received for execution. An online system 100 may compile all available byte code stored in the byte code store 260, for example, as a batch process and store the generated executable code in the executable code store 270. Compiling all available byte code store in advance ensures that executable code is readily available for any request that is received by the online system, so long as the corresponding script code is available in the script code store 120. However, script code typically supports features that make it difficult to generate efficient executable code. For example, script code may support untyped variable for which the type is not available until runtime. Programmers often use untyped variables since they do not require the programmer to make early decisions regarding types of variables used. A programmer may specify a variable as untyped even if at runtime the variable only stores values of one particular type, for example, an integer value. In practice significant amount of script code is executed based on a limited set of types corresponding to the untyped variables. However, if the online system 100 compiles the byte code to executable code prior to receiving the requests at runtime, the type information may not be available for the variables. A byte code compiler 230 that compiles the byte code without making any specific assumptions about the types of the variables may generate inefficient executable code since the generated executable code accounts for all possible types that each untyped variable may take, whether or not the incoming requests use these types.

Embodiments of the byte code compiler 230 compile byte code to executable code based on information available at runtime. For example, the byte code compiler 230 may utilize type information of variables obtained during an execution of the script code to generate executable code optimized for these specific types. Accordingly, executable code required for executing a request may or may not be available in the executable code store 270 at runtime. If executable code corresponding to the request is not available in the executable code store 270, the execution engine 240 identifies byte code corresponding to the request from the byte code store 260. The execution engine 240 invokes the byte code compiler 230 to compile the byte code corresponding to the request to generate executable code. The execution engine 240 provides type information of variables obtained during the current execution of the script code to the byte code compiler 230. Accordingly, the byte code compiler 230 generates efficient executable code based on the type information of variables available. The execution engine 240 executes the generated executable code. In some embodiments, executable code may be generated directly from script code without requiring byte code generation.

If future executions of the script code provide variables of the same type as the first request, the executable code can be reused for the future requests. However, if a subsequent execution provides a different combination of types of variables compared to the first execution, the execution engine 240 invokes the byte code compiler 230 to generate executable code corresponding to the new combination of types corresponding to the variables. Accordingly, the executable code store 270 may store different executable codes for the same byte code program, each executable code corresponding to a different combination of variable types. The byte code compiler 230 may never generate executable code corresponding to type combinations that are never received in executions of the script code.

In an embodiment, the byte code compiler 230 compiles a basic block of byte code at a time. A basic block of code has one entry point, i.e., no instruction within the basic block other than the entry point can be reached from anywhere in the script code as a destination of a jump instruction. The entry point is typically the first instruction of the basic block. A basic block may have one or more exit point, i.e., typically the last instruction of the basic block causes the program control to start executing another basic block. The last instruction may evaluate certain condition and determine the next basic block for execution based on the result of the evaluation of the condition. For example, the last instruction may evaluate a binary condition and transfer program control to one basic block if the condition evaluates to true otherwise transfer program control to another basic block (if condition evaluates to false). Similarly, the last instruction of the basic block may transfer control to different basic blocks based on the value of a particular variable. For example, if the variable value is 1, program control is transferred to basic block B1, if the variable value is 2, program control is transferred to basic block B2, if the variable value is 3, program control is transferred to basic block B3, and so on. The simple structure of a basic block makes it easy for the byte code compiler 230 to optimize and compile a basic block.

The executable code of the script includes executable blocks (also referred as "executable basic blocks") of the script and/or executable control regions of the script. An executable block corresponds to a basic block of the script (which is described in further detail with reference to FIGS. 4 and 5), whereas an executable control region of the script includes instructions for executing a set of basic blocks. An executable control generator 235 generates an executable control region for a set of basic blocks based on various criteria (which is described in further detail with reference to FIGS. 6-10).

Figure 3:
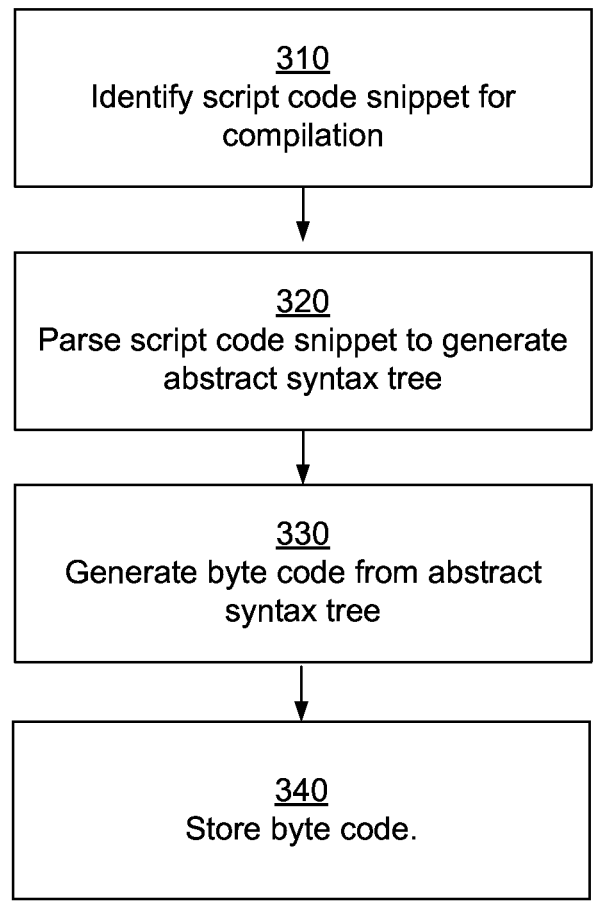
FIG. 3 is a flow diagram of a process of compiling script code.

FIG. 3 is a flow diagram of a process of compiling script code, consistent with various embodiments. The process illustrated in FIG. 3 may be executed by the script compiler 110 as a batch process that compiles script code stored in the script code store 120. For example, software developers may periodically provide new scripts implementing certain features of the online system 100. The received script code may be compiled as a batch process by the online system 100. Alternatively, software developers may update existing script code, thereby requiring recompilation of the updated script code. The script compiler 110 may repeat the steps shown in FIG. 3 for all the script code that need to be recompiled.

The script compiler 110 identifies 310 a script for compilation. The script compiler 110 invokes the parser 210 for parsing the script. The parser 210 parses 320 the script code to generate an AST representation of the script code. The parser 210 stores the AST representation in the AST store 250. In an embodiment, modules of the script compiler 110 perform various operations using the AST representation, for example, static analysis, type inference, and optimizations. As a result, the script compiler 110 may annotate the AST and/or transform the AST. The script compiler 110 stores the annotated ASTs or the transformed ASTs in the AST store 250. Each step performed by the script compiler 110 typically uses the latest version of the AST from the AST store 250 and generates a subsequent version of the AST. The byte code compiler 230 generates 330 byte code from the AST representation of the script code and stores 340 the generated byte code in the byte code store 260.

The byte code compiler 230 incrementally compiles the byte code stored in the byte code store at runtime to generate corresponding executable code. The byte code compiler 230 performs the incremental compilation responsive to executions of the script code, for example, executions caused by requests received from client devices 160.

In at least some embodiments, the execution engine 240 requests compilation of one basic block of byte code at a time. More specifically, the execution engine 240 requests compilation of one basic block for a particular combination of types of the variables as required for execution of an incoming request. In at least some other embodiments, the execution engine 240 may request compilation of a group of basic blocks to generate more optimal executable code. Additionally or alternatively, the execution engine 240 may request the compilation of one basic block during a first phase of execution of the script, and request compilation of group of basic blocks during a second phase of execution.

Figure 4:
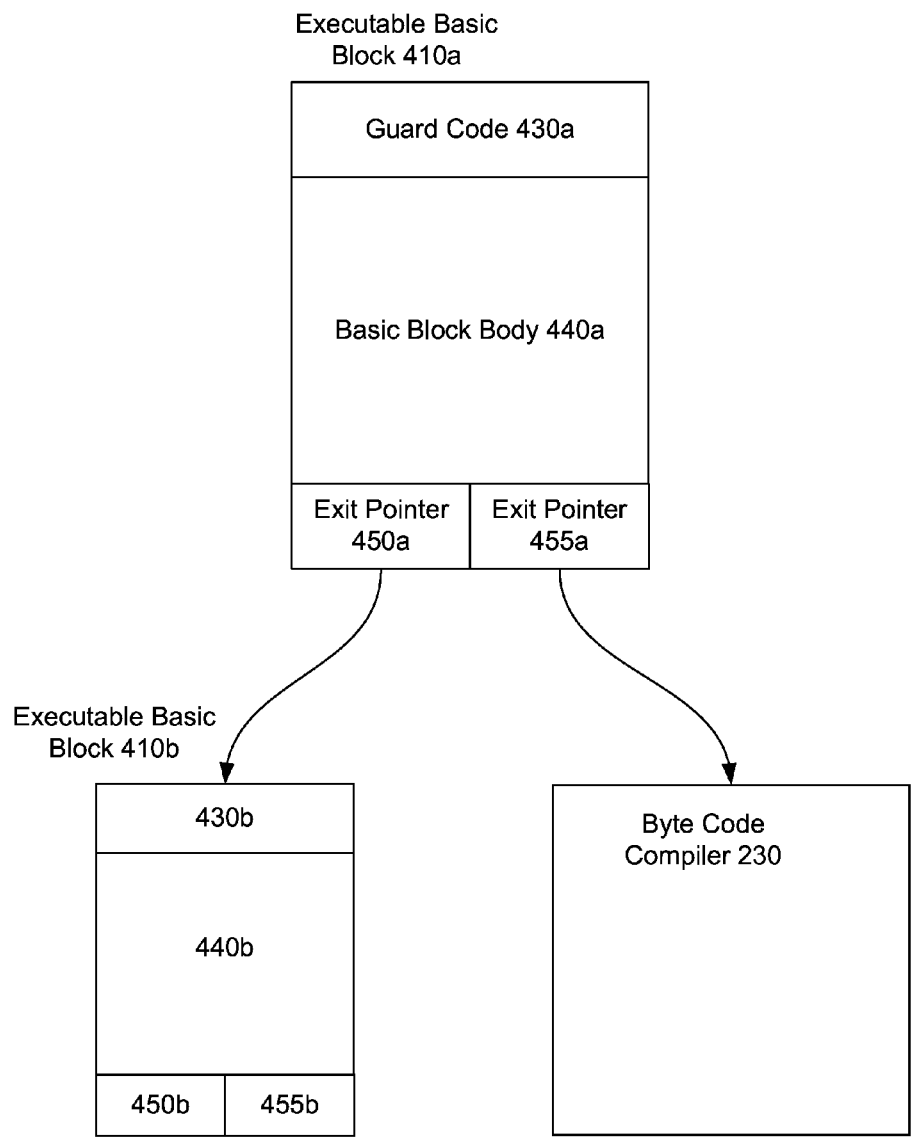
FIG. 4 is a block diagram illustrating the structure of executable code generated by a script compiler.

FIG. 4 is a block diagram illustrating the structure of executable code generated by a script compiler, consistent with various embodiments. The generated executable basic block 410 includes a portion of guard code 430, a basic block body 440, and one or more exit pointers 450. The executable basic block 410 is generated in response to receiving a request from the client device 160. Accordingly, the executable basic block 410 is optimized for the types of variables as provided by the incoming request.

The following example illustrates how executable code is generated for a given basic block. Assume that a basic block includes two untyped variables varA and varB. Further assume that for a particular execution it is determined that both variables varA and varB are integers. Accordingly, the byte code compiler 230 compiles the basic block to generate the basic block body 440 assuming the variables varA and varB are integers. The guard code 430 includes instructions that check a particular condition before executing the basic block body 440. In the above example, the generated guard code 430 verifies that the types of variables varA and varB are integers. If the types of both variables are integers, the guard code 430 continues execution of the basic block body 440.

The last instruction of an executable basic block 410a that is executed typically causes the program control to begin execution of another executable basic block 410b. Accordingly, the last instruction of the executable basic block 410 may include an exit pointer 450 that specifies the address of an executable basic block 410b for execution after the execution of the executable basic block 410. The last instruction of an executable basic block 410a that is executed may transfer control to different executable basic blocks 410 depending on certain criteria. For example, the last instruction in a basic block may correspond to an "if" condition that executes one basic block if the condition is evaluated to true and another basic block if the condition is evaluated to false. Therefore, the last instruction of the executable basic block 410 may include one or more exit pointers 450a, 455a, and so on.

The exit pointer 450a points to another executable basic block 410b. If a particular executable block that needs to be executed subsequent to the execution of the executable basic block 410a has not been compiled so as to generate a corresponding executable basic block, the corresponding exit pointer 455a transfers control to the byte code compiler 230. The byte code compiler 420 may be provided with information describing the subsequent basic block that needs to be compiled. The address of the subsequent basic block may be communicated to the byte code compiler 230 using function-calling conventions of the native machine in which the system is hosted. In this embodiment, the byte code compiler 230 obtains the address of the byte code corresponding to the subsequent basic block to be compiled from the top of the stack. Once the byte code compiler 230 generates an executable basic block 410 corresponding to the subsequent basic block, the pointer 455a is changed to point to the generated executable basic block instead of the byte code compiler 230.

In at least some embodiments, the byte code compiler 230 generates different executable basic blocks for different combinations of type of the variables of a basic block. That is, the byte code compiler 230 generates one executable basic block for variable types integer, another executable basic block where both the variables are float, another executable basic block where one variable is integer and another is float and so on.

Further, in at least some other embodiments, the executable basic blocks may be generated based on criterion other than type of variables in the basic block. The guard code would have instructions accordingly to verify the criteria based on which the executable block is created before the basic block body of the executable block is executed.

Figure 5:
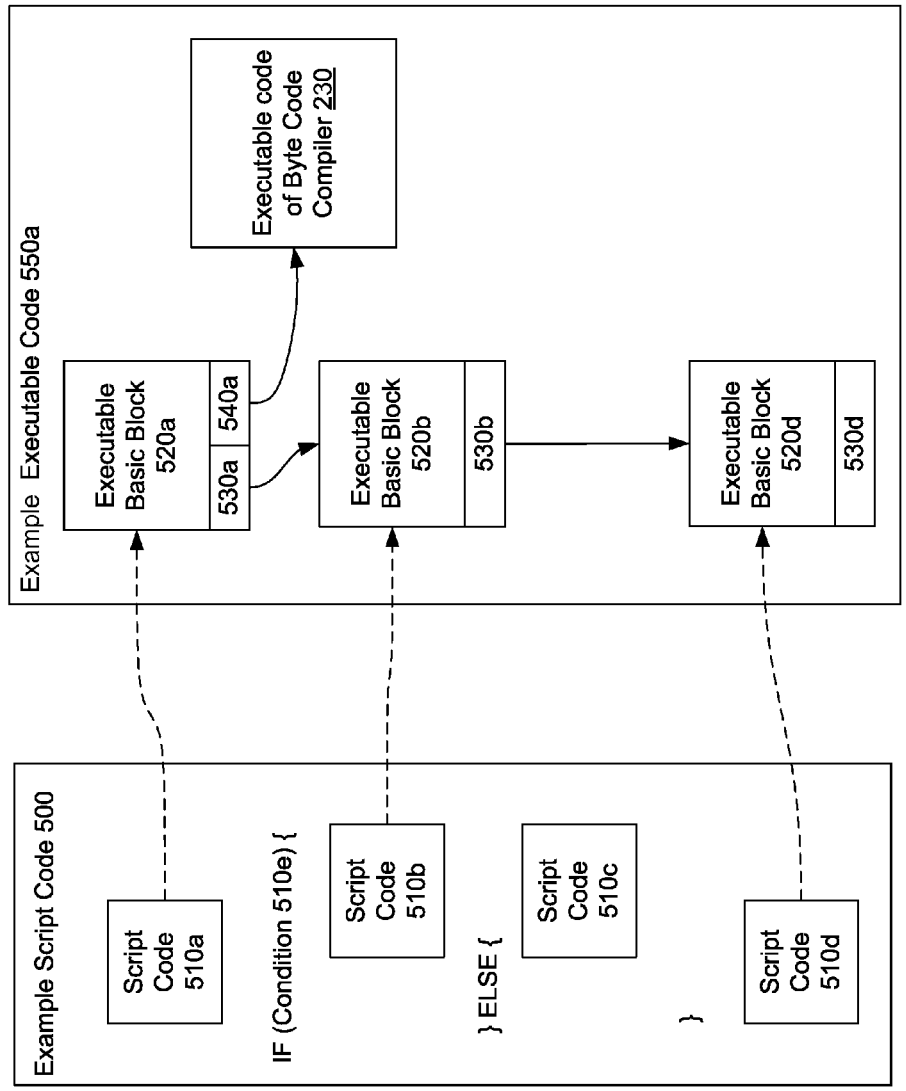
FIG. 5 is a block diagram illustrating incremental compilation of byte code obtained from an example script code.

FIG. 5 is a block diagram illustrating incremental compilation of byte code obtained from an example script code, consistent with various embodiments. The example script code 500 can be executed in response to a request from client device 160. The example script code 500 includes a portion of byte code 510a followed by an if-then-else statement, followed by another portion of byte code 510d. The if-then-else statement includes a condition 510e, a portion of byte code 510b that is executed if condition 510e evaluates to true, and a portion of byte code 510c that is executed if the condition 510e evaluates to false.

Assume that a request is received from a client 160 that includes values of variables that result in the condition 410e evaluating to true. The resulting executable code generated by the byte code compiler 230 includes the executable code 550a shown in FIG. 5. The portion of script code 510a combined with the condition 510e corresponds to executable code 520a. The executable code 520 includes a guard code 430 in the beginning to verify whether the types of the variables correspond to a specific combination. The end of the executable code 520a includes instructions evaluating the condition 510e. If the condition 410e evaluates to true, the program control is transferred according to exit pointer 530a otherwise the program control is transferred according to exit pointer 540a.

Since the current request received from the client 160 results in the condition 410e evaluating to true, the executable basic block 520b corresponding to portion of script code 510b is also generated. The script code 500 shows that after execution of script code 510b, the script code 510d is executed. Accordingly, the executable basic block 520d corresponding to the script code 510d is also generated. For the execution of the current request, the script code 510c is never executed since it corresponds to the "else" portion of the if-the-else statement that is not executed when the condition 510e evaluates to true. Accordingly, the end of executable basic block 520a includes an exit pointer 540a pointing to the byte code compiler 230 with information identifying byte code corresponding to script code 510c.

If several subsequent requests all include variables with types matching those corresponding to the previous request and result in condition 510e evaluating to true, the executable code 550a can be executed to process these requests. A new set of executable code 550 may be generated if a request is received that requires execution of script code 500 with a new combination of types of variables, different from those corresponding to executable code 550. However, if all requests received from the client device 160 continue providing the same combination of variable types and always result in the condition 510e evaluating to true, the executable code 550 continues to process the requests and no new executable code needs to be generated.

If at any stage, an execution of the script code is performed that provides the previous combination of variable types that cause the condition 510e to evaluate to false, the exit pointer 540a causes the byte code compiler 230 to be invoked causing an executable basic block to be generated corresponding to the script code 510c. The script compiler 110 changes the exit pointer 540a to point to the generated executable basic block instead of the byte code compiler 230. Since the execution of the script code 510c is followed by the execution of the script code 510d, the exit pointer at the end of the executable basic block is configured to point to the executable block 520d corresponding to script code 510d. The executable code 550a which now includes executable block for script code 510c can process requests that result in the condition 510e evaluating to true as well as false without having to invoke the byte code compiler 230. Furthermore, the executable basic block for script code 510c is not generated unless an execution that causes the condition 510e to evaluate to false is received. Accordingly, the script compiler 110 generates executable code in a lazy fashion, the generation performed only if a request requires certain portion of script code to be executed. As a result, the script compiler 110 does not generate dead code, i.e., code that is never executed.

In at least some embodiments, the execution of the script code 500 is optimized using an IR of the script code. Typically, a compiler, such as a byte code compiler 230, translates the script code first to some form of IR and then converts the IR into machine code/executable code such as executable blocks of FIGS. 4 and 5.

Figure 6:
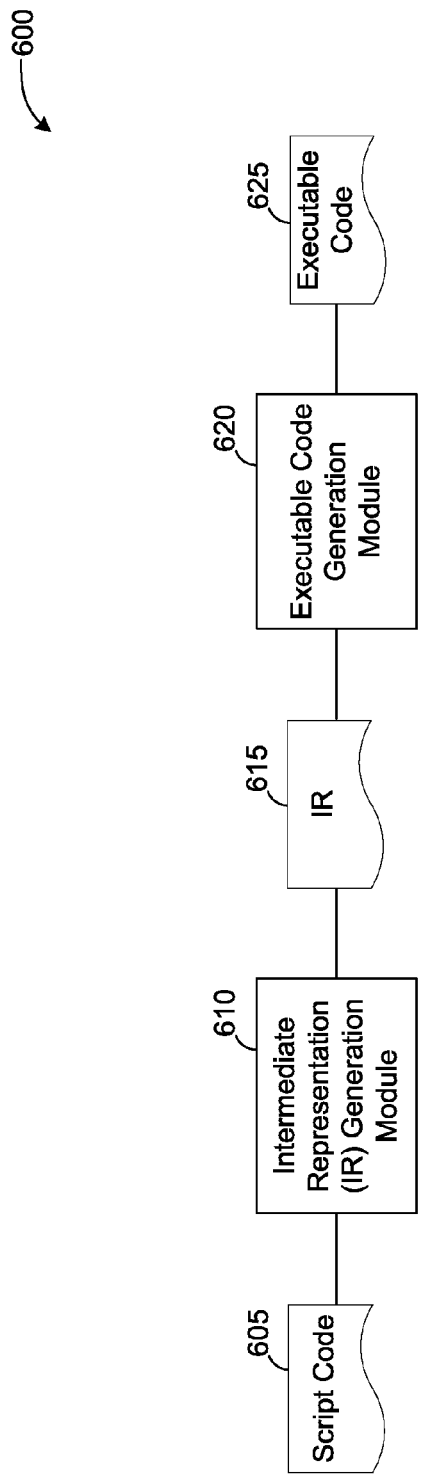
FIG. 6 is a block diagram of a system for generating the IR of the script code and converting the IR to executable code for executing the script code.

FIGS. 6-12 provide examples of generating an IR of a script code, and optimizing the IR based on an analysis of code for reference count of an object. FIG. 6 is a block diagram of a system 600 for generating the IR of the script code and converting the IR to executable code for executing the script code. The system 600 includes an IR generation module 610 to generate an IR 615 of script code 605, and an executable code generation module 620 to generate an executable code 625 based on the IR 615. The IR 615 includes code for tracking reference count of an object, e.g., number of references, entities, or pointers pointing to an object allocated in the memory. More particularly, the IR 615 includes (a) "incref" code—code for incrementing a reference count of an object when a programming construct such as a variable refers to the object, and (b) an observer code, e.g., "decref" code that decrements the reference count of the object when a reference to the object is removed.

Further, the decref code can trigger the execution of a user-defined code, such as a destructor, when the reference count of the object goes down to zero. In some embodiments, the destructor is typically executed to perform certain user defined operations when the object is deleted from the memory.

The script code 605 and IR 615 can take various forms. For example, the script code can be similar to script code 500 or byte code as described in FIG. 2, or can include code written in programming languages other than PHP, such as Java, C++, etc. The IR 615 can be generated as a byte code of FIG. 2, or in formats other than the byte code, or in any form between the script code 605 and executable code 625. The executable code 625 is a code generated for a particular type of processor.

In some embodiments, the system 600 can be part of or similar to the online system 100, and therefore, the script code 605 can be similar to script code 500 of FIG. 5, the IR 615 can be similar to the byte code described with reference to FIG. 2 or can be generated from the byte code in a form between the byte code and the executable code 625 of FIGS. 4 and 5.

Figure 7:
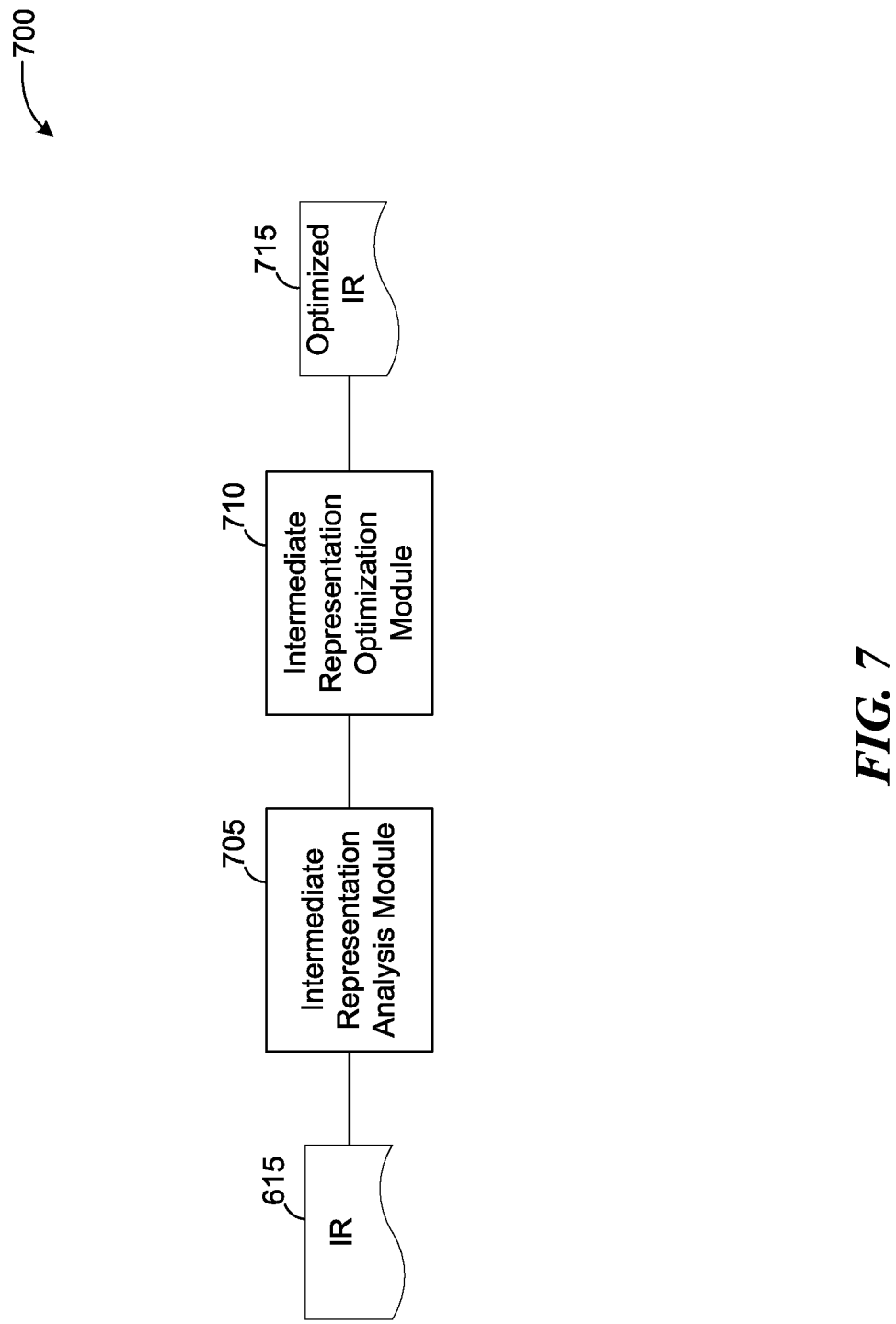
FIG. 7 is a block diagram of a system for optimizing the IR of the script code.

In some embodiments, the IR 615 is further optimized before it is converted into executable code 625. FIG. 7 is a block diagram of a system 700 for optimizing the IR of the script code, consistent with various embodiments. The system 700 includes an IR analysis module 705 that analyzes the IR 615 to identify redundant code associated with managing reference count of an object, e.g., incref-decref pair. An IR optimization module 710 removes the identified redundant reference code, e.g., incref-decref pair from the IR 615 to generate an optimized IR 715. In some embodiments, the system 700 can be part of online system 100. The analysis and optimization of the IR 615 is described at least in association with FIGS. 8-12 below.

Figure 8A:
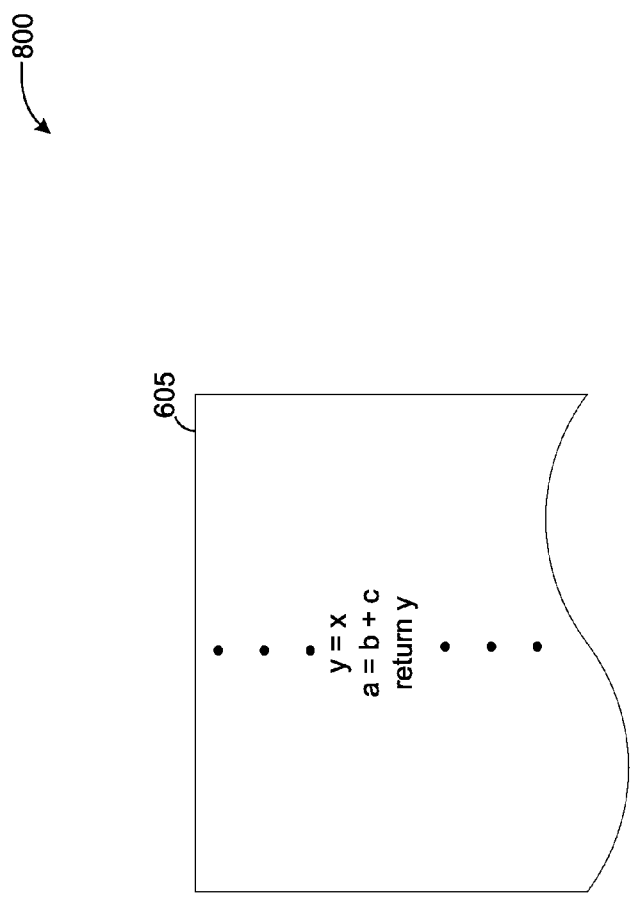
FIG. 8A is a block diagram illustrating an example script code.
Figure 8B:
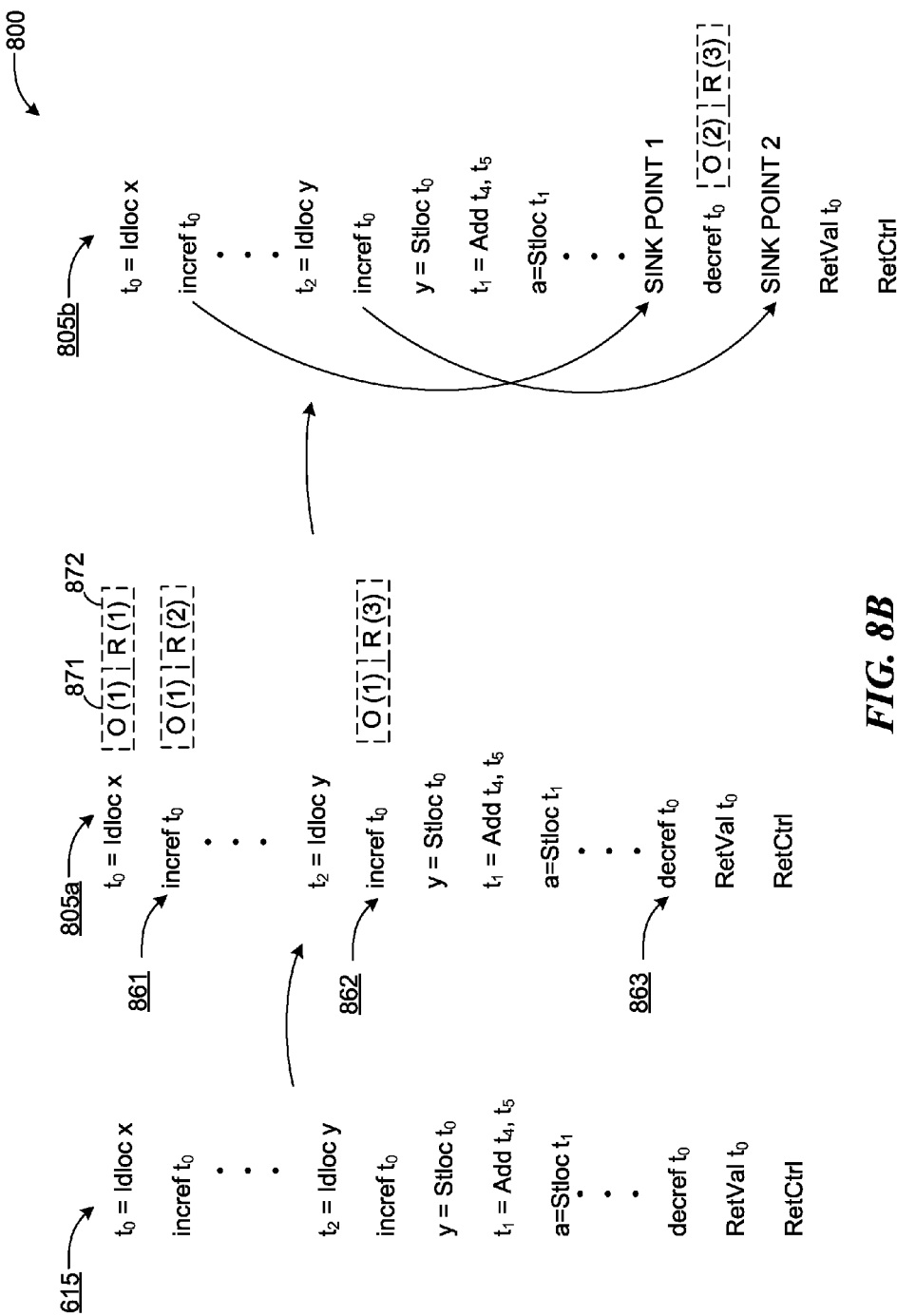
FIG. 8B is a block diagram of an example analysis of an IR of the script code of FIG. 8A.
Figure 8C:
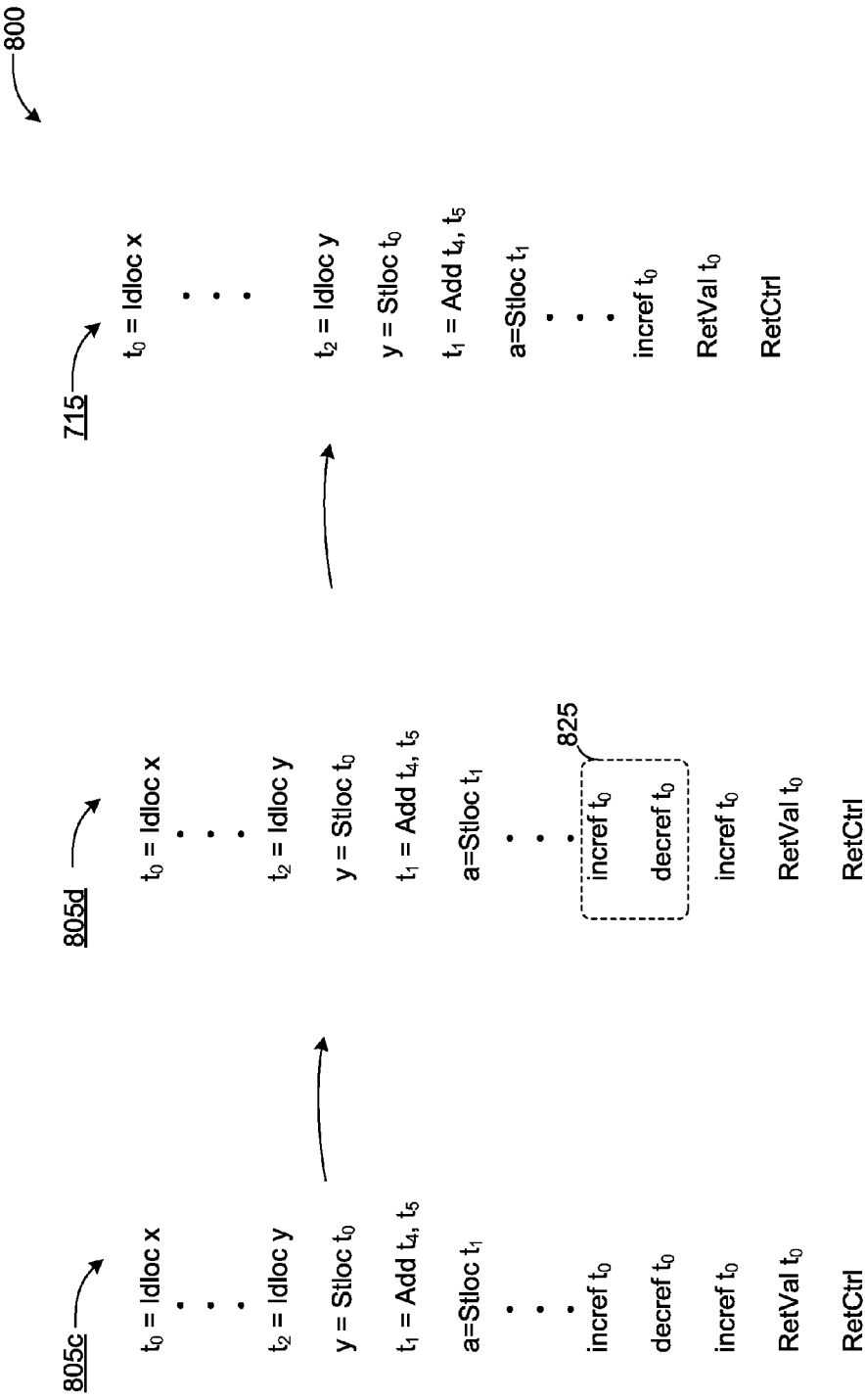
FIG. 8C is a block diagram of another example analysis of the IR of the script code of FIG. 8A.
Figure 8D:
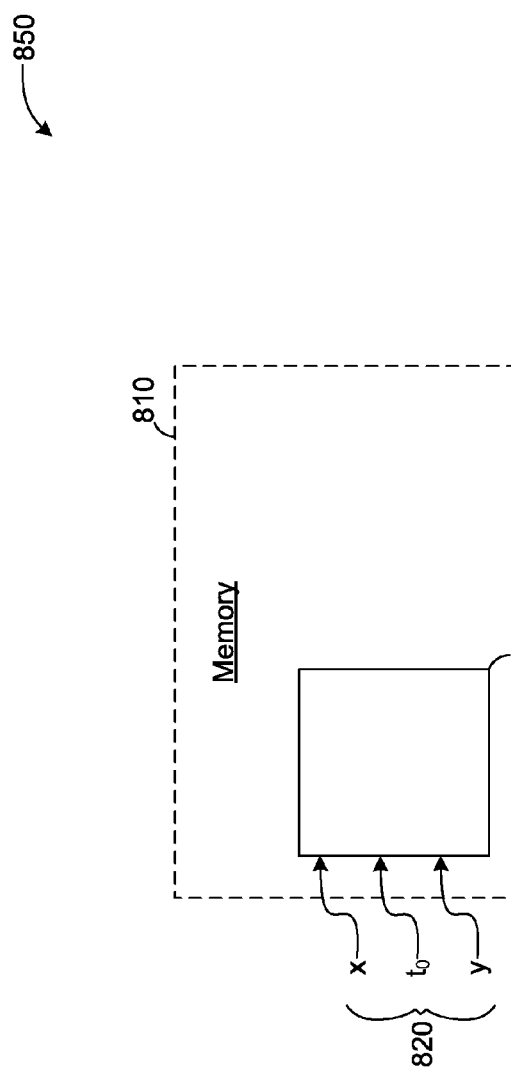
FIG. 8D is a block diagram illustrating references to an object.

FIG. 8, which includes FIGS. 8A, 8B, 8C and 8D, illustrates an example 800 of the script code 605 which is translated into an example IR 615 and then optimized into an example optimized IR 715, consistent with various embodiments. The script code 605 can be executed in a system such as system 700. Consider that a portion of script code 605 includes a line of code for copying a value of one variable to another, e.g., "y=x." That is, a value of variable x is copied to variable y. The script code 605 also includes code for adding two other variables, e.g., "a=b+c" and code "return y" for returning the value of "y." Further, consider that the variables are local to a method in the script code 605. However, in other embodiments, the scope of the variables can vary. For example, the variables can be local to an executable block such as the one described in FIGS. 4 and 5 or local to a file containing a portion of the code, etc. The variable x can have an object of any data type, including float, integer, array or a user-defined data type. Typically, when a variable of a particular data type is initialized, the system allocates a portion of the memory to an object "pointed to" or "referred by" the variable. For example, when a variable x is assigned an object 815 of a particular data type, the system allocates a portion of the memory 810 to the object 815 pointed to or referred by x. FIG. 8D is a block diagram of an example 850 that shows the object 815 and the pointers pointing to the object 815. In the example 850, pointer "x" of pointers 820 points to the object 815 when the variable "x" is assigned to the object 815. When the value of variable x is copied to variable y, y also points to object 815, and the pointers 820 are updated to include pointer "y." As the number of references to the object 815 increase, the reference count of the object can also increase.

During the execution of the script code 605, the object 815 may be copied to various variables, and the number of pointers or references to the object 815 may increase accordingly. The variables pointing to the object 815 may be overwritten with other objects or values, thereby decreasing the number of pointers to the object 815. When the object 815 is not referred to by any variables, that is, when there are no pointers pointing to the object 815, the object 815 may be deleted. The memory allocated to object 815 is reclaimed by the system, which is also referred to as "garbage collection."

As part of garbage collection, the user may also request the system to execute user-defined code, such as a destructor. To ensure that the garbage collection process executes only when there are no pointers pointing to the object 815 (e.g., when the reference count of the object 815 is zero), the IR generation module 610 generates in the IR 615 of the script code 605, code for adjusting the reference count of the object 815, e.g., incref and decref code as shown in FIGS. 8B and 8C, and code for tracking the references to the object 815, e.g., an optimized counter 871 and a real counter 872. The IR analysis module 705 and the IR optimization module 710 can ensure that only the incref-decref pair that does not cause the garbage collector to execute is eliminated. In other words, the IR analysis module 705 and the IR optimization module 710 can eliminate only the incref-decref pair that does not cause the reference count of an object to go down to zero.

FIGS. 8B and 8C describe the analysis and optimization of the IR 615. The portion of the IR 615 in FIG. 8B includes code for a portion of the script code "y=x," "a=b+c" and "return y." The variable x is loaded into a temporary variable t0. Now, since $t_0$ is also pointing to the object 815 pointed to by x, the reference count of the object 815 is incremented by one. Accordingly, code "incref t0" is generated, as shown in IR 615 of FIG. 8B. Before variable y is overwritten with x, the current value or the object pointed to by y is stored in another temporary variable t2. The reference count to object 815 is again incremented since y would also point to object 815 when x is loaded into y. Accordingly, an increment operation is performed on the variable to which the object 815 is initially assigned, e.g., t0. Thus, code "incref t0" is generated again, as shown in IR 615. Finally, the value of x stored in temporary variable to is stored into variable y, as indicated by code "y=Stloc t0" in IR 615.

The IR 615 also includes code "RetVal t0" which corresponds to the script code "return y" for returning the value of variable "y." After the value of "y" is returned from the method, the variable t0, which is a temporary variable local to the method, is removed as a reference to the object 815 and therefore, the reference count is decremented. Accordingly, code "decref t0" is generated, as shown in IR 615.

Further, the IR 615 also includes code for script code "a=b+c," e.g., "t1=t4+t5" and "a=Stloc t1" which adds the two variables "b" and "c" and stores the sum in a third variable "a."

The IR 615 may be optimized by, for example, removing redundant incref-decref pair, which minimizes the computing resources consumed for the execution of the script code 605. The IR analysis module 705 analyzes the IR 615 to identify redundant incref-decref pair, e.g., a decref code that does not cause the reference count of an object to go down to zero and an associated incref code.

Redundant incref-decref code may be identified in various ways. One way of identifying the redundant incref-decref code pair is as follows. The IR analysis module 705 identifies a first assignment of the object to a variable, e.g., loading object 815 pointed to by "x" into variable $t_0$, and initializes the counters associated with the object 815, e.g., optimized counter 871 and real counter 872 to a specified value, e.g., "1," as illustrated in IR 805a. In some embodiments, the optimized counter 871 maintains an optimized reference count of the object, e.g., reference count of the object 815 after optimization, reference count of the object 815 if the IR is optimized. In some embodiments, the real counter 872 maintains an actual reference count of the object, e.g., reference count of the object 815 without optimization.

After initializing the counters, the IR analysis module 705 continues with analyzing the IR 805a to identify occurrences of the incref code and the decref code. The IR analysis module 705 increments the real counter 872 by a unit, e.g., by "1" at every occurrence of an incref code. For example, the real counter 872 is incremented once at the first occurrence 861 of the incref code, which increases the value of the real counter 872 to "2," and incremented again at the second occurrence 862 of the incref code, which increases the value of the real counter 872 to "3" as illustrated in FIG. 8B. While the real counter 872 is incremented at every occurrence of the incref code, in some embodiments, the optimized counter 871 is not modified.

The IR analysis module 705 continues with the analysis and identifies a first occurrence 863 of the decref code. The IR analysis module 705 determines whether the counters, e.g., value of the counters, satisfy an optimization criterion. In some embodiments, the optimization criterion is specified by the decref code. If the optimization criterion is satisfied, the IR analysis module 705 determines that the incref code of the object can be moved adjacent to the decref code. For example, the optimization criterion of the decref code to optimize the IR can be that at least one of the counters is not equal to "1." In the IR 805a, at the first occurrence 863 of the decref code, the real counter 872 is not equal to "1" and therefore, the optimization criterion is satisfied.

The IR analysis module 705 identifies a position in the IR adjacent to the decref code where the incref code can be moved, e.g., by adding sink points at the identified position. In some embodiments, the first occurrence 861 of the incref code is moved to just before the first occurrence 863 of the decref code and the remaining occurrences of the incref code (e.g., that occur before the first occurrence 863 of the decref code) is moved to after the first occurrence 863 of the decref code. The remaining occurrences of the incref code can be moved to immediately after the first occurrence 863 of the decref code or after other lines of code after the first occurrence 863 of the decref code. In the FIG. 8B, the IR analysis module 705 adds a sink point "SINK POINT 1" at immediately before the first occurrence 863 of the decref code for moving the first occurrence 861 of the incref code and a "SINK POINT 2" at immediately after the first occurrence 863 of the decref code for moving the second occurrence 862 of the incref code, as illustrated in IR 805b.

After adding the sink points, the IR analysis module 705 increments the optimized counter 871 by a unit, e.g., 1. The IR analysis module 705 or the IR optimization module 710 moves the incref code to the portion of the IR identified by the sink points, as illustrated in the IR 805c of FIG. 8C. The IR analysis module 705 or the IR optimization module 710 identifies the incref code and the decref code that are adjacent to each other, e.g., incref code and a decref code which immediately follows the incref code, and deletes them from the IR.

In the FIG. 8C, the IR analysis module 705 or the IR optimization module 710 identifies the incref-decref pair 825, as illustrated in IR 805d, and deletes the incref-decref pair 825 from the IR 805d to generate the optimized IR 715.

In some embodiments, before moving the incref code adjacent to the decref code, the IR 615 is analyzed to determine if the object (or value of the object) to which a variable the incref-decref pair is operating on is pointing has changed in the portion of IR 615 between an occurrence of the incref code and the decref code. If the object has not changed, then the IR analysis module 705 can determine to move the occurrence of the incref code adjacent to the decref code, provided the counters associated with the object satisfy the optimization criterion. For example, in the IR 615, the IR analysis module 705 or the IR optimization module 710 determines it is safe to move the first and second occurrences 861 and 862 of the incref code operating on the variable t0 adjacent to the first occurrence 863 of the decref code since the variable t0 (and therefore the object pointed to by t0) is not altered by the code between the first and/or second occurrences 861 and 862 of the incref code and the first occurrence 863 of the decref code.

However, if the object has changed between any of the occurrences of the incref code and the occurrence of the decref code, the IR analysis module 705 may determine not to move the occurrence of the incref code.

The above described optimization of the IR 615 may be performed in one or more passes. In an embodiment, the optimization of the IR 615 is performed in multiple passes. For example, in a first pass the IR analysis module 705 analyzes the IR 615 to determine the values of the counters associated with the object and determine if they satisfy the optimization criterion specified by the decref code, as illustrated in IR 805a of FIG. 8B. In the second pass, the IR analysis module 705 adds the sink point(s) to the IR, as illustrated in IR 805b. In a third pass, the IR analysis module 705 moves the incref code. In a fourth pass, the IR analysis module 705 removes the incref-decref pair.

It should be noted the number of passes can vary in various embodiments, and the functions performed in each pass can also vary. For example, the above four-pass optimization example can be implemented as one-pass, two-pass, three-pass, etc., optimization.

Figure 9A:
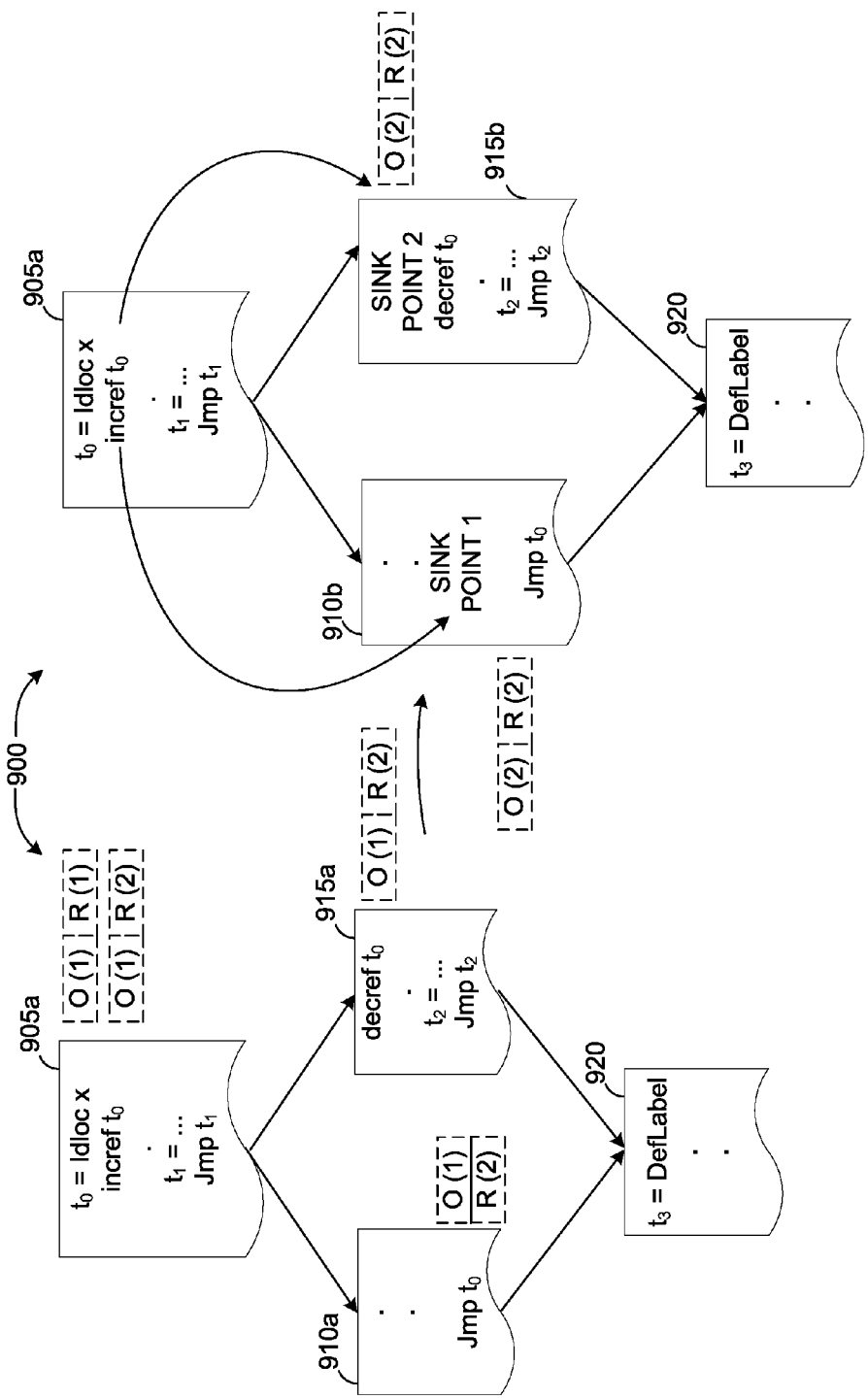
FIG. 9A is a block diagram of an example of optimizing the IR of the script code for various paths of execution.
Figure 9B:
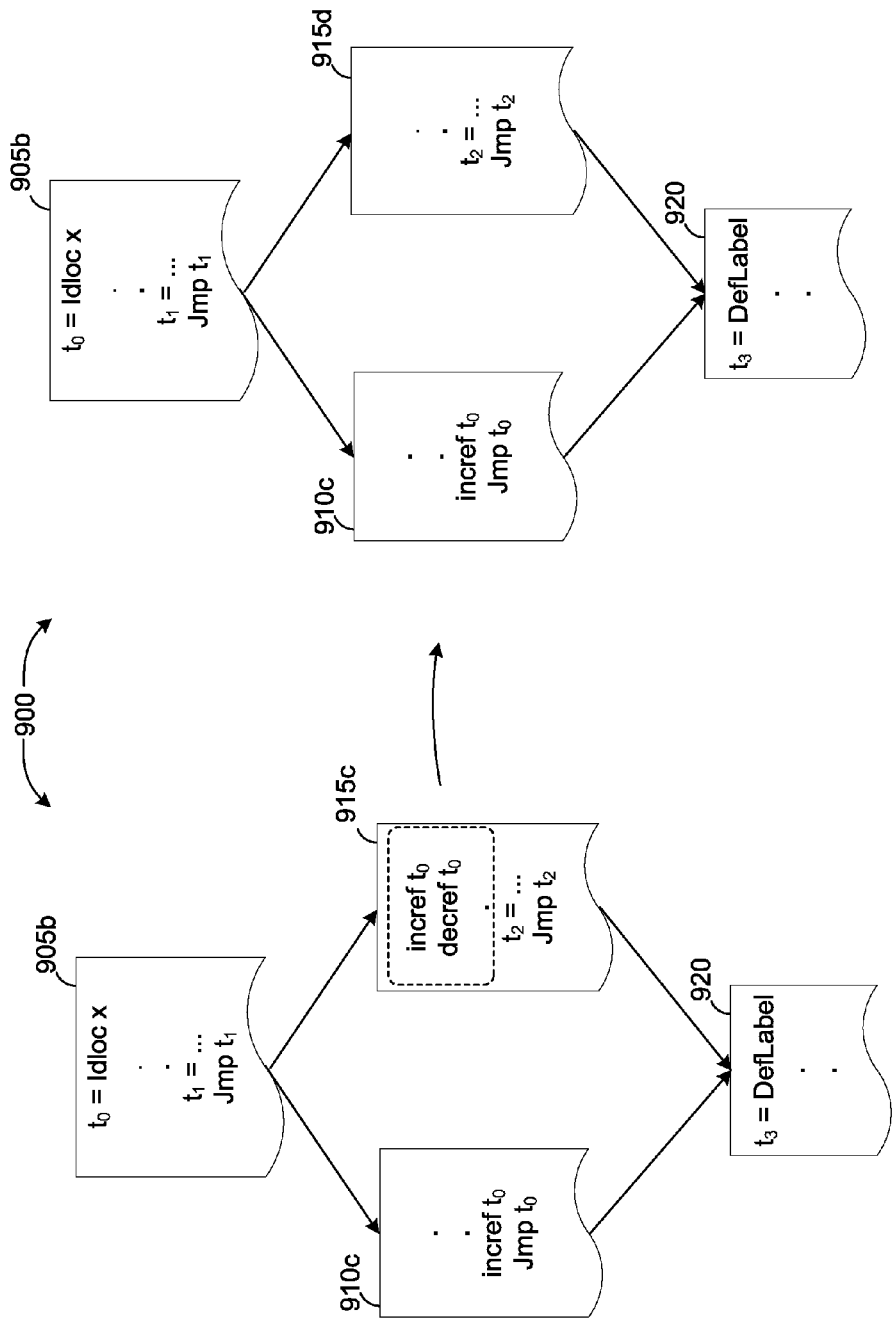
FIG. 9B is a block diagram of another example of optimizing the IR of the script code for various paths of execution.

In some embodiments, the optimization process also considers branching of the execution control to various portions of the script code. FIG. 9, which includes FIGS. 9A and 9B, is a block diagram of an example 900 of optimizing the IR 615 of the script code for various paths of execution. The IR 615 includes a branch or jump command that can transfer the execution from one block to another block. In the example 900, the execution can transfer from a first block 905a to a second block 910a or a third block 915a based on the value of variable t1. After the execution of either the second block 910a or the third block 915a, the execution is transferred to the fourth block 920. In the fourth block 920, the value of the variable t3 will be equal to variable t0 or t2 depending on which of the second block 910a and the third block 915a executes. Further, the value of t0 in the fourth block 920, when the second block 910a executes is different from that of when the third block 915a executes as the third block 915a includes a decref on the variable t0 and the second block 910a does not.

Accordingly, the optimization process may have to ensure that when a redundant incref-decref pair is eliminated from one path of execution does not create an inconsistency in another path of execution. In some embodiments, to avoid the inconsistency, the IR analysis module 705 adds one or more incref statements to one or more paths in the IR when the redundant incref-decref pair is eliminated from a path.

The IR analysis module 705 analyzes all the paths, e.g., as described above to identify the redundant incref-decref pair. For example, the IR analysis module 705 initializes the optimized counter and the real counter for the object pointed to by the variable t0 in the first block 905a. The IR analysis module 705 then analyzes both the paths in the example 900 and determines the counters satisfy the optimization criterion. Note that the counters are evaluated at the occurrences of observer code, e.g., code that consumes or whose execution depends on a reference count of the object. The counters are evaluated at the decref code in the path having the decref code, e.g., path via the third block 915a, and at the "Jmp t0" in the path having the jump on variable t0, e.g., path via the second block 910a. The IR analysis module 705 then adds a sink point prior to the observer code in both the paths. For example, the IR analysis module 705 adds a sink point "SINK POINT 1" just before the "Jmp t0" code, as illustrated in the second block 910b and "SINK POINT 2" just before the decref code in the third block 915b.

The IR analysis module 705 or the IR optimization module 710 moves the occurrence of the incref from the first block 905b to one of the sink points, e.g., in the second block 910c of FIG. 9B, and adds another incref code operating on the variable t0 at another one of the sink points, e.g., in the third block 915c of FIG. 9B. By inserting an incref code in one or more paths, the IR analysis module 705 or the IR optimization module 710 prevents any inconsistency of the reference count that can be caused due to the moving of the incref code to another path and consequently removing the redundant incref-decref pair from the other path.

After the incref code is moved and/or added at the sink points, the IR analysis module 705 or the IR optimization module identifies the incref-decref pair, e.g., incref-decref pair in the third block 915c, and deletes the incref-decref pair, e.g., as illustrated in the third block 915d, to generate the optimized IR. After the optimization, the value of variable t0 in the fourth block 920 is the same as what the value of variable t0 would have been prior to optimization.

Figure 10:
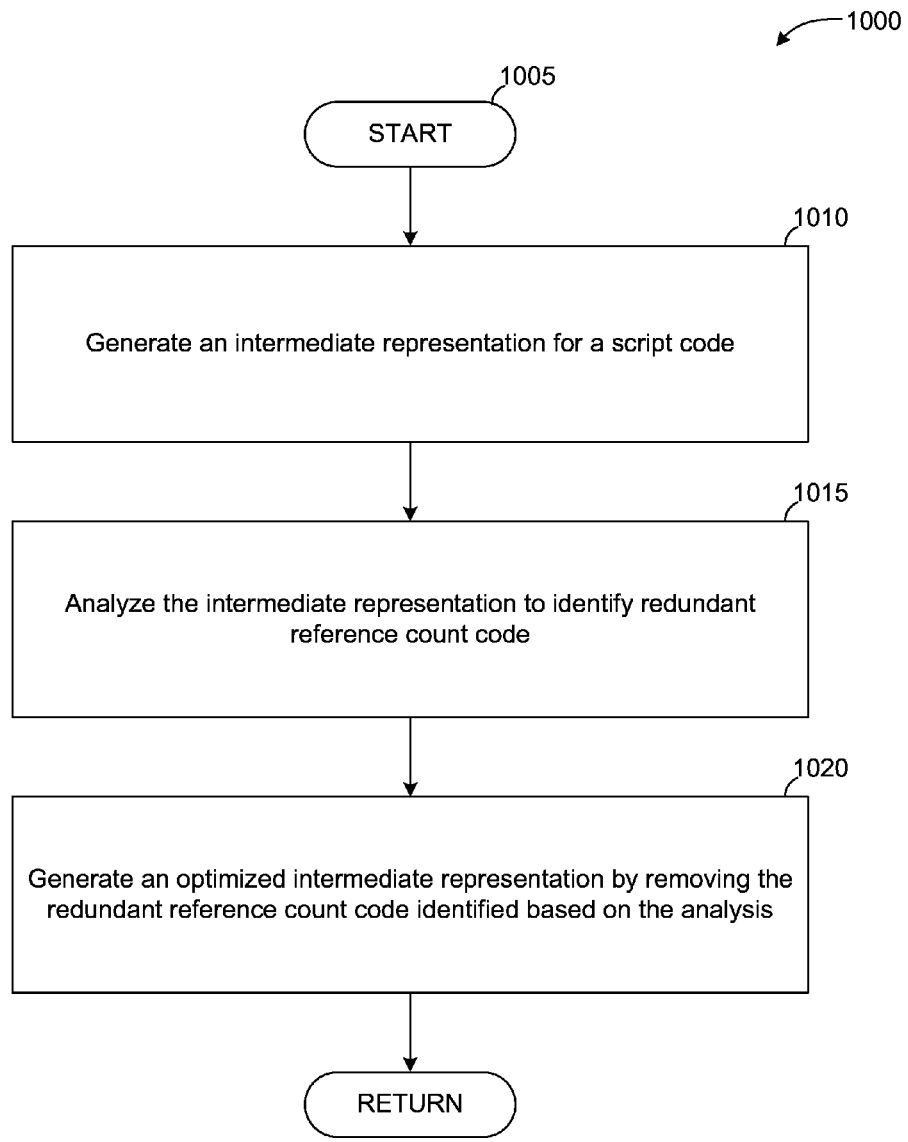
FIG. 10 is a flow diagram of a process of optimizing the IR of the script code by eliminating redundant reference count code from the IR.

FIG. 10 is a flow diagram of a process of optimizing the IR of the script code by eliminating redundant reference count code from the IR, consistent with various embodiments. The process 1000 may be executed in a system such as online system 100 and/or system 700. The process beings at block 1005, and at block 1010, the IR generation module 610 generates an IR for a script code, e.g., IR 615 for script code 605. In some embodiments, the IR 615 includes incref code for incrementing a reference count of an object and an observer code that consumes or the execution of which depends on the reference count of the object. Examples of observer code include decref code and code that manage arrays. The decref code decrements the reference count of an object, and executes a specified method, e.g., a destructor when the reference count of the object is of a specified value, e.g., "0."

At block 1015, the IR analysis module 705 analyzes the IR 615 to identify redundant incref-decref code pair. In some embodiments, a redundant incref-decref code pair includes a code pair that does not reduce the reference count of an object pointed to by the variable on which the code pair operates to zero when the code pair is deleted. At block 1020, the IR optimization module 710 generates an optimized IR 715 by eliminating the redundant incref-decref code pair from the IR 615.

Figure 11:
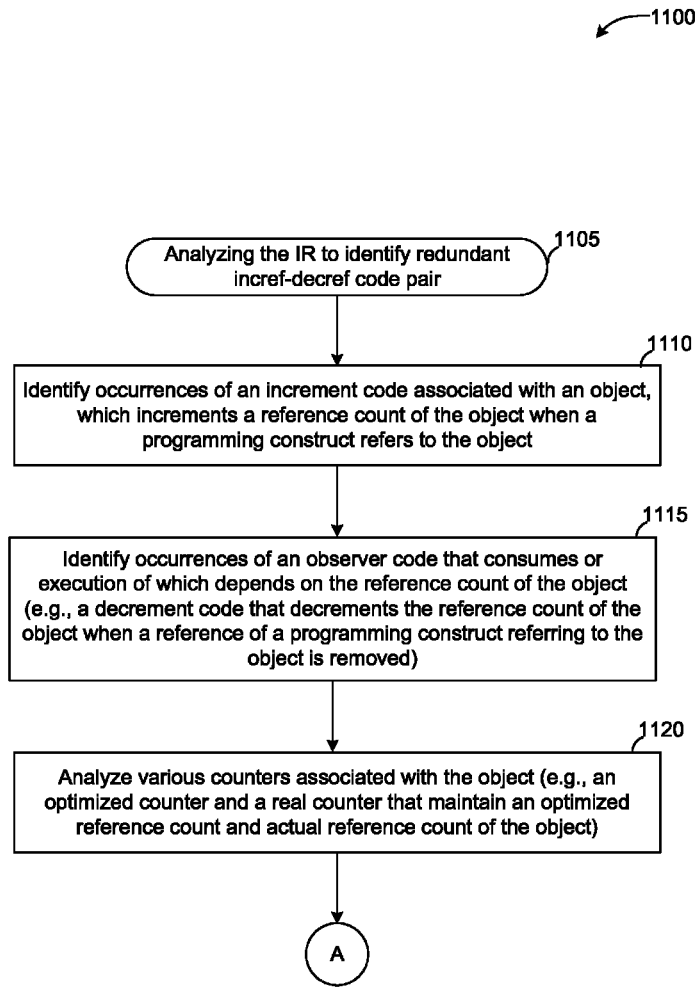
FIG. 11 is a flow diagram of a process of analyzing the IR of the script code to identify redundant reference count code.
Figure 11:
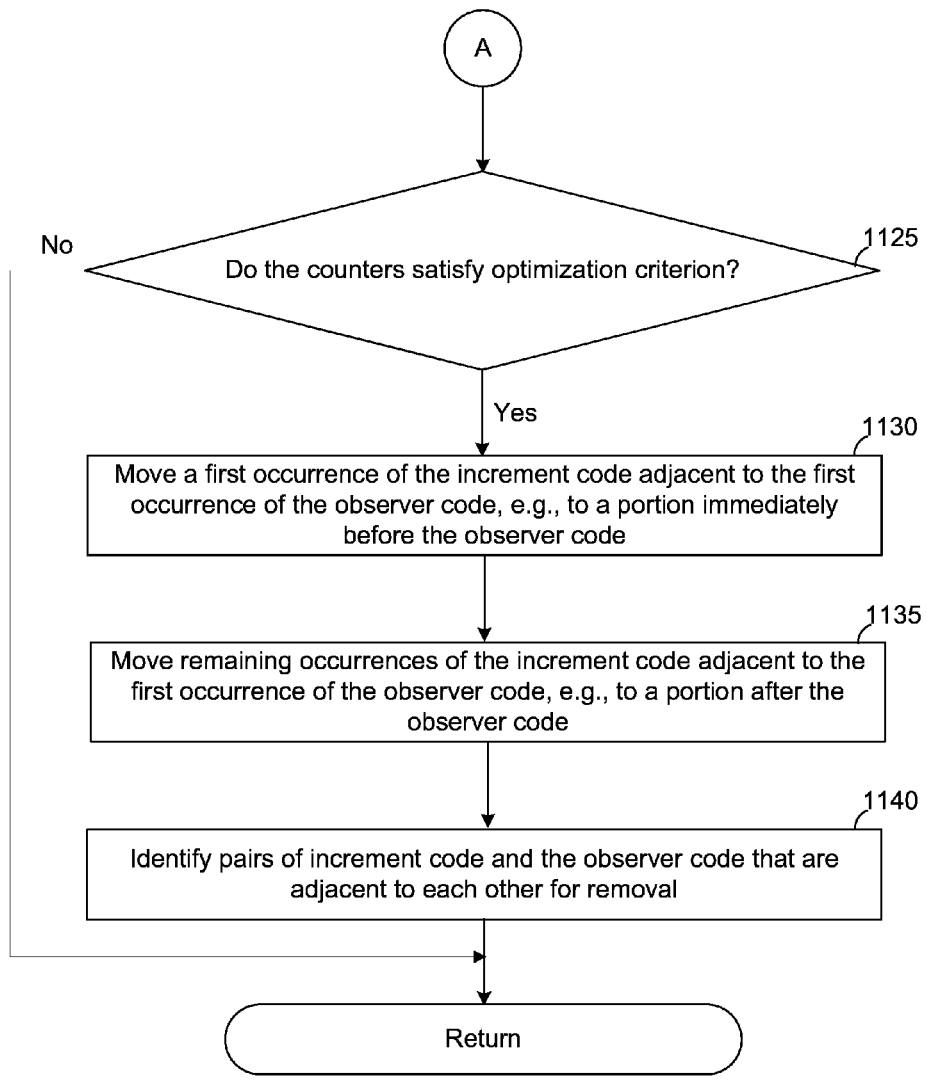

FIG. 11 is a flow diagram of a process 1100 of analyzing the IR of the script code to identify redundant reference count code, consistent with various embodiments. The process 1100 may be executed in a system such as online system 100 and/or system 700 and can be the block 1015 of the process 1000. The process 1100 begins at block 1105, and at block 1110, the IR analysis module 705 identifies occurrences of an incref code associated with an object, which increments a reference count of the object when a programming construct refers to the object. For example, as described with reference to FIG. 8, the IR analysis module 705 identifies occurrences 861 and 862 of the incref code.

At block 1115, the IR analysis module 705 identifies occurrences of an observer code that consumes, or the execution of which depends on, the reference count of the object. In some embodiments, a decref code that decrements the reference count of the object when a reference of a programming construct referring to the object is removed is an observer code. The decref code behaves differently for different values of the reference count. For example, if the reference count of an object is zero, the decref code can execute a destructor associated with the object to release the memory occupied by the object. As an example, the IR analysis module 705 identifies the occurrence 863 of the decref code.

At block 1120, the IR analysis module 705 analyzes various counters associated with object. In some embodiments, the counters can include an optimized counter that maintains an optimized reference count of the object, and a real counter that maintains an actual reference count of the object.

At determination block 1125, the IR analysis module 705 determines whether the counters satisfy the optimization criterion. In some embodiments, the optimization criterion is specified by the observer code. For example, the optimization criterion of the decref code to optimize the IR can be that at least one of the counters is not equal to "1."

Responsive to a determination that that counters do not satisfy the optimization criterion the process 1100 returns. On the other hand, responsive to a determination that that counters satisfy the optimization criterion, at block 1130, the IR analysis module 705 or the IR optimization module 710 moves a first occurrence of the incref code adjacent to the first occurrence of the observer code, e.g., to a portion immediately before the observer code. For example, as described in FIG. 8, the first occurrence 861 of the incref code is moved to just before the first occurrence 863 of the decref code.

At block 1135, the IR analysis module 705 or the IR optimization module 710 moves the remaining occurrences of the incref code adjacent to the first occurrence of the observer code, e.g., to a portion after the observer code. For example, as described in FIG. 8, the second occurrence 862 of the incref code is moved to after the first occurrence 863 of the decref code. The remaining occurrences of the incref code can be moved to immediately after the first occurrence of the observer code or after other lines of code after the first occurrence of the observer code.

In some embodiments, moving of the incref code can be performed as one or more steps. For example, after determining that the counters satisfy the optimization criterion, the IR analysis module 705 identifies a position in the IR adjacent to the decref code where the incref code can be moved, e.g., by adding sink points at the identified position. In the FIG. 8B, the IR analysis module 705 adds a sink point "SINK POINT 1" at immediately before the first occurrence 863 of the decref code for moving the first occurrence 861 of the incref code and a "SINK POINT 2" at immediately after the first occurrence 863 of the decref code for moving the second occurrence 862 of the incref code. After adding the sink points, the IR analysis module 705 moves the incref code to the corresponding sink points.

At block 1140, the IR analysis module 705 or the IR optimization module 710 identifies the incref code and the decref code that are adjacent to each other, e.g., incref code and a decref code which immediately follows the incref code, for deletion, and the process 1100 returns. In the FIG. 8C, the IR analysis module 705 or the IR optimization module 710 identifies the incref-decref pair 825 for deletion.

Figure 12:
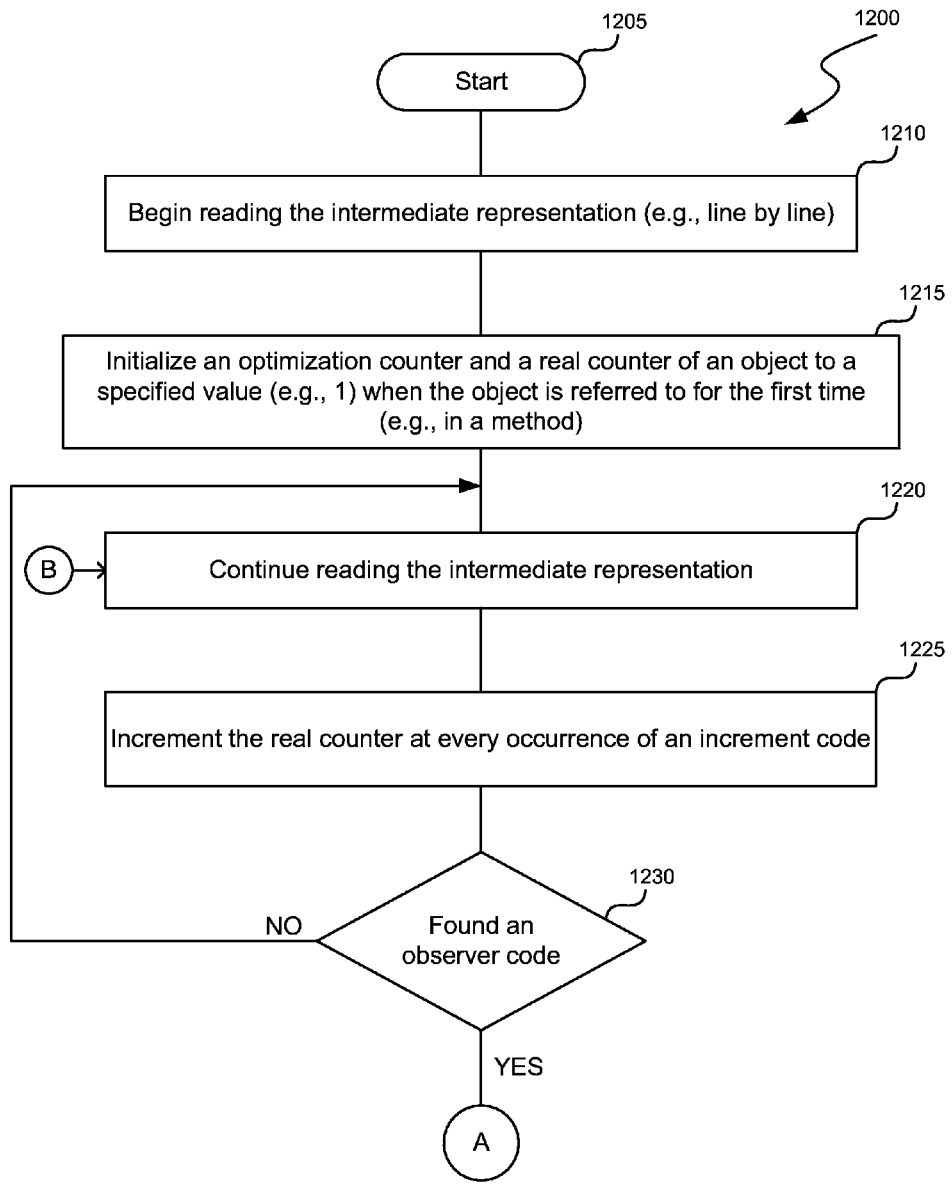
FIG. 12 is a flow diagram of a process of managing various counters associated with an object which indicate different types of reference count of the object.
Figure 12:
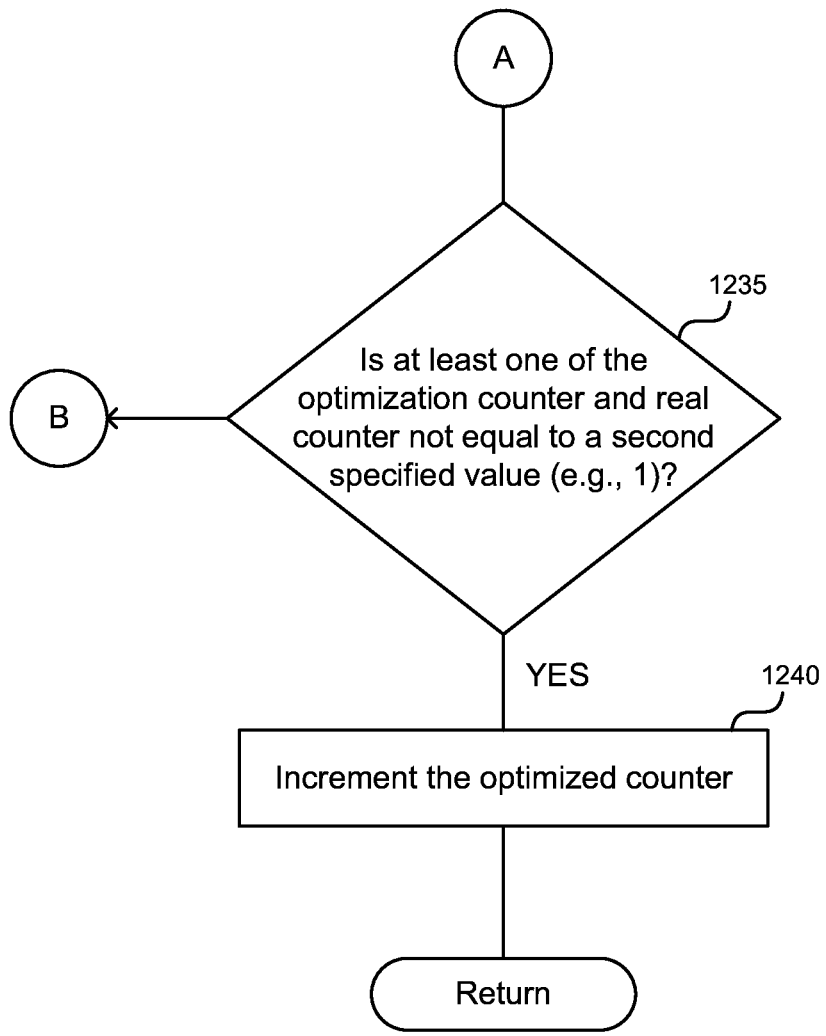

FIG. 12 is a flow diagram of a process of managing various counters associated with an object which indicate different types of reference count of the object, consistent with various embodiments. The process 1200 may be executed in a system such as online system 100 and/or system 700. The process 1200 begins at block 1205, and at block 1210, the IR analysis module 705 begins to read the IR of the script code, e.g., line by line. At block 1215, the IR analysis module 705 initializes the counters associated with an object when an object is referred to for the first time (e.g., when a local variable refers to an object for the first time in a method of the script code). In some embodiments, the counters can include the optimized counter and the real counter. In some embodiments, the counters are initialized to a specific value, e.g., "1."

At block 1220, the IR analysis module 705 continues with reading the remaining portion of the IR. At block 1225, the IR analysis module 705 increments the real counter by a specified unit, e.g., "1," at every occurrence of the incref code for the object. At determination block 1230, the IR analysis module 705 determines whether an observer code, e.g., decref code is identified. If the observer code is not identified, the IR analysis module 705 continues with reading the remaining portion of the IR at block 1220.

On the other hand, if an observer code is identified, at determination block 1235, the IR analysis module 705 determines whether both the optimized counter and the real counter satisfy an optimization criterion specified by the observer code, e.g., whether at least one of the counters is not equal to "1." Responsive to a determination that the optimization criterion is not satisfied, the IR analysis module 705 continues with reading the remaining portion of the IR at block 1220. On the other hand, responsive to a determination that the optimization criterion is satisfied, at block 1240, the IR analysis module 705 increments the optimized counter by a unit, e.g., "1," and the process 1200 returns.

Figure 13:
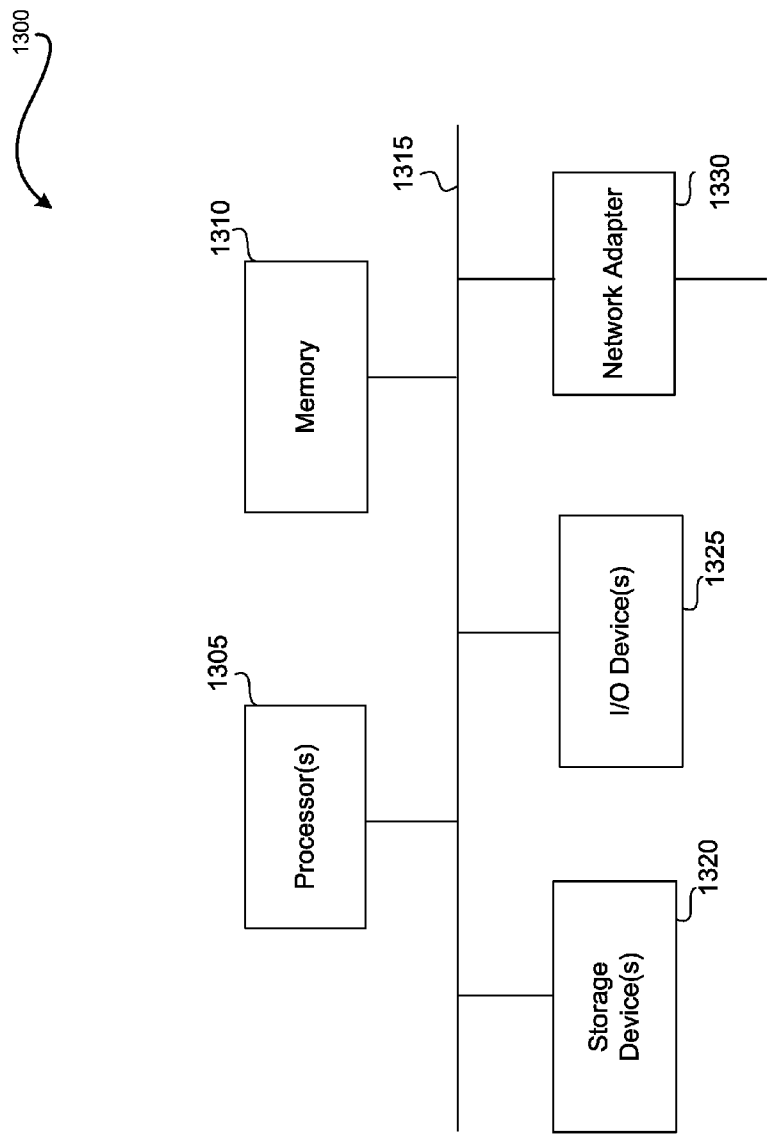
FIG. 13 is a block diagram of a processing system that can implement operations of the present invention.

FIG. 13 is a block diagram of a computer system as may be used to implement features of some embodiments of the disclosed technology. The computing system 1300 may be used to implement any of the entities, components or services depicted in the examples of FIGS. 1-12 (and any other components described in this specification). The computing system 1300 may include one or more central processing units ("processors") 1305, memory 1310, input/output devices 1325 (e.g., keyboard and pointing devices, display devices), storage devices 1320 (e.g., disk drives), and network adapters 1330 (e.g., network interfaces) that are connected to an interconnect 1315. The interconnect 1315 is illustrated as an abstraction that represents any one or more separate physical buses, point to point connections, or both connected by appropriate bridges, adapters, or controllers. The interconnect 1315, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1310 and storage devices 1320 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 1310 can be implemented as software and/or firmware to program the processor(s) 1305 to carry out actions described above. In some embodiments, such software or firmware may be initially provided to the processing system 1300 by downloading it from a remote system through the computing system 1300 (e.g., via network adapter 1330).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method comprising:
   identifying, by a computer, in an intermediate representation of a script code, a plurality of occurrences of an increment code associated with an object, each of the occurrences of the increment code incrementing a reference count of the object when a programming construct refers to the object, the reference count indicating a number of references to the object;
   identifying, by the computer, a plurality of occurrences of a decrement code associated with the object, each of the occurrences of the decrement code decrementing the reference count of the object when a reference of a programming construct referring to the object is removed;
   analyzing, by the computer, the intermediate representation to identify an increment-decrement code pair, the increment-decrement code pair including an occurrence of the increment code that is adjacent to an occurrence of the decrement code in the intermediate representation; and
   removing, by the computer, the increment-decrement code pair from the intermediate representation.

2. The method of claim 1, wherein the intermediate representation is a form of the script code which is convertible to an executable code for execution of the script code.

3. The method of claim 1 further comprising:
   converting, at the computer, the intermediate representation to an executable code; and
   executing, at the computer, the script code using the generated executable code.

4. The method of claim 1, wherein the increment code operates on a first variable, the first variable containing a value of the object.

5. The method of claim 4, wherein the decrement code operates on the first variable.

6. The method of claim 1, wherein analyzing the intermediate representation to identify the increment-decrement code pair includes:
   determining, at a first occurrence of the plurality of occurrences of the decrement code, a first value of an optimized counter and a second value of a real counter, the optimized counter maintaining a optimized reference count of the object and the real counter maintaining a count of actual number of references to the object; and
   moving a first occurrence of the plurality of occurrences of the increment code adjacent to the first occurrence of the decrement code if at least one of the first value and the second value exceeds a specified value.

7. The method of claim 6, wherein moving the first occurrence of the increment code adjacent to the first occurrence of the decrement code includes:
   moving the first occurrence of the increment code to a portion of the intermediate representation that executes immediately before the first occurrence of the decrement code.

8. The method of claim 6 further comprising:
   moving at least some of the remaining occurrences of the plurality of occurrences of the increment code to a portion of the intermediate representation that executes after the first occurrence of the decrement code.

9. The method of claim 6, wherein the occurrence of the decrement code in the increment-decrement pair yields a non-zero value for the real counter if executed.

10. The method of claim 6, wherein the real counter is incremented by a second specified value at each of the plurality of occurrences of the increment code.

11. The method of claim 6, wherein the optimized counter is incremented by a second specified value when the first occurrence of the increment code is moved adjacent to the first occurrence of the decrement code.

12. The method of claim 6, wherein moving the first occurrence of the increment code adjacent to the first occurrence of the decrement code includes:
   determining whether the intermediate representation includes a first code that is assigned to a variable on which the first occurrence of the increment code operates,
   responsive to a determination that the intermediate representation includes the variable, determining whether the variable is modified by the first code, and
   responsive to a determination that the variable is not modified by the first code, moving the first occurrence of the increment code adjacent to the first occurrence of the decrement code.

13. The method of claim 6, wherein moving the first occurrence of the increment code adjacent to the first occurrence of the decrement code includes:
   moving the first occurrence of the increment code from a first portion of the intermediate representation to a second portion of the intermediate representation, the second portion excluding occurrences of the decrement code, and
   inserting a first increment code adjacent to the first occurrence of the decrement code in a third portion of the intermediate representation.

14. The method of claim 13, wherein when the intermediate representation is executed, one of the second portion or the third portion is executed after execution of the first portion.

15. A computer-readable storage medium storing computer-readable instructions, comprising:
   instructions for analyzing, at a computer, an intermediate representation of a script code to:
      identify multiple occurrences of an increment code, wherein at least some of the occurrences, upon execution, increments a reference count of an object when a programming construct refers to the object, and
      identify an observer code whose execution depends on the reference count of the object;
   instructions for moving a first occurrence of the plurality of occurrences of the increment code adjacent to the observer code if an optimized counter and a real counter associated with the object satisfies a criterion specified by the observer code, the first occurrence of the increment code and the observer code forming an increment-observer code pair; and instructions for removing, by the computer and from the intermediate representation, the increment-observer code pair.

16. The computer-readable storage medium of claim 15, wherein the optimized counter maintains an optimized reference count of the object and the real counter maintains a count of actual number of references to the object.

17. The computer-readable storage medium of claim 15, wherein the instructions for moving the first occurrence of the increment code based on the criterion includes instructions for moving the first occurrence of the increment code if at least one of the optimized counter or the real counter exceeds a specified value specified by the observer code in the criterion.

18. A system comprising:
a processor;
an intermediate representation generation module to generate an intermediate representation of a script code, the intermediate representation including:
multiple occurrences of an increment code associated with an object, at least some of the occurrences of the increment code incrementing a reference count of the object when a programming construct refers to the object, and
multiple occurrences of a decrement code associated with the object, at least one of the occurrences of the decrement code decrementing the reference count of the object when a reference of a programming construct referring to the object is removed;
an analysis module to move a first occurrence of the occurrences of the increment code adjacent to a first occurrence of the occurrences of the decrement code in an event at least one of an optimized counter or a real counter associated with the object exceeds a specified value, the first occurrence of the increment code and the first occurrence of the decrement code forming an increment-decrement code pair; and
an intermediate representation optimization module to remove the increment-decrement code pair from the intermediate representation.

19. The system of claim 18, wherein the optimized counter maintains an optimized reference count of the object and the real counter maintains a count of actual number of references to the object.

20. The system of claim 18 further comprising:
an executable code generation module to convert the intermediate representation to an executable code in response to a request to execute the script code.

* * * * *